United States Patent
Pyle

(10) Patent No.: US 12,316,510 B2
(45) Date of Patent: May 27, 2025

(54) PROVIDING CLOUD MATURITY SCORES FOR IMPROVING CLOUD COMPUTING HEALTH

(71) Applicant: CDW LLC, Vernon Hills, IL (US)

(72) Inventor: Christopher Pyle, Delray Beach, FL (US)

(73) Assignee: CDW LLC, Vernon Hills, IL (US)

(*) Notice: Subject to any disclaimer, the term of this patent is extended or adjusted under 35 U.S.C. 154(b) by 3 days.

(21) Appl. No.: 18/215,682

(22) Filed: Jun. 28, 2023

(65) Prior Publication Data
US 2025/0007794 A1  Jan. 2, 2025

(51) Int. Cl.
G06F 15/173 (2006.01)
H04L 41/16 (2022.01)
H04L 41/50 (2022.01)

(52) U.S. Cl.
CPC .............. H04L 41/50 (2013.01); H04L 41/16 (2013.01)

(58) Field of Classification Search
CPC .............................. H04L 41/50; H04L 41/16
USPC ......................................................... 709/223
See application file for complete search history.

(56) References Cited

U.S. PATENT DOCUMENTS

| | | | | |
|---|---|---|---|---|
| 2014/0278623 A1* | 9/2014 | Martinez | ................ | G06Q 10/06 705/7.12 |
| 2014/0280961 A1* | 9/2014 | Martinez | ................ | H04L 41/40 709/226 |
| 2015/0341240 A1* | 11/2015 | Lyoob | ................ | G06Q 30/0631 709/201 |
| 2019/0306236 A1 | 10/2019 | Wiener et al. | | |
| 2021/0240539 A1 | 8/2021 | Murthy et al. | | |
| 2021/0279066 A1* | 9/2021 | Xiao | .................... | G06F 9/45508 |
| 2022/0035680 A1* | 2/2022 | Sharma | ............ | G06Q 10/06393 |
| 2023/0188613 A1* | 6/2023 | Velammal | ................ | G06F 8/72 709/203 |

OTHER PUBLICATIONS

Vmware, "VMware Aria Cost powered by CloudHealth" Retrieved from the Internet at :<URL: <https://cloudhealth.vmware.com/> (2023).
FinOps, "What is FinOps?" Retrieved from the Internet at: <URL:https://www.finops.org/introduction/what-is-finops/> (2021).

(Continued)

Primary Examiner — Alan S Chou
(74) Attorney, Agent, or Firm — MARSHALL, GERSTEIN & BORUN LLP; Randall G. Rueth

(57) ABSTRACT

A computing system includes a processor; an electronic network; and a memory having stored thereon computer-executable instructions that, when executed, cause the computing system to receive hyperscaler cloud computing data; process the cloud computing data to determine status information; compare the status information rules; and generate cloud maturity scores. A method includes receiving hyperscaler cloud computing data; processing the cloud computing data to determine status information; comparing the status information rules; and generating cloud maturity scores. A computer-readable medium includes computer-executable instructions that, when executed, cause a computer to: receive hyperscaler cloud computing data; process the cloud computing data to determine status information; compare the status information rules; and generate cloud maturity scores.

17 Claims, 36 Drawing Sheets

(56) References Cited

OTHER PUBLICATIONS

CDW, "Inscape from CDW" Retrieved from the Internet <URL:https:// <https://www.youtube.com/watch?v=mQfN0V8g4cU> (2023).
Gui et al., A service brokering and recommendation mechanism for better selecting cloud services, PLoS One, 9(8):e105297 (Aug. 2024).
International Application No. PCT/US2024/034950, International Search Report and Written Opinion, mailed Sep. 9, 2024.

\* cited by examiner

| Innovation | Cost | Agility | Risk | Experience |
|---|---|---|---|---|
| Inscape is an all-encompassing Cloud Business Platform of service offerings to help clients discover, manage, govern, report, optimize, adopt, train and procure the most popular Cloud and SaaS applications. | Inscape provides in depth multicloud cost management services, budgeting, reporting, recommendations, vendor commitment tracking and machine learning cost anomaly detection to assist our customers in mastering their cloud financial operations. | Inscape is developed within the Agile framework. We run towards major epic stories that are rolled out bi-monthly sprints. Every two weeks we are pushing new features and functions out into the inscape platform based upon our end-user community input. | Iscape helps our customers mitigate risks in their Azure, AWS, and Microsoft 365 cloud environments by providing actionable reports and recommendations to better secure their environments. | Our Inscape Client Success Advisors ensure that our clients unleash the full business value of our platform. They assist customers with onboarding, training, and support and to make sure that our clients experience is superior. |

Inscape Recommendation Engine

Our Inscape platform delivers a powerful recommendation engine to help you optimize your Microsoft and/or AWS cloud environment. Get comprehensive recommendations and alerts that will potentially save you money, improve your security posture, optimize performance, and much more.

502-A

MICROSOFT COST SAVING RECOMMENDATIONS
Inscape helps you optimize and reduce your overall Azure spend by identifying idle and underutilized resources. These are the areas of cost savings that Inscape can recommend:

502-B

Compute
• Use Standard Storage to store Managed Disks snapshots
• Right-size or shutdown underutilized virtual machines
• If you have disks which have not been attached to a VM for more than 30 days (evaluate if you still need the disk)

MariaDB
• Right-size underutilized MariaDB servers

MySQL
• Right-size underutilized MySQL servers

PostGreSQL
• Right-size underutilized PostgreSQL servers

Cosmos DB
• Review the configuration of your Azure Cosmos DB free tier account
• Consider taking action on your idle Azure Cosmos DB containers
• Enable autoscale on your Azure Cosmos DB database or container
• Configure manual throughput instead of autoscale on your Azure Cosmos DB database or container

Data Explorer
• Unused/Empty Data Explorer resources
• Right-size Data Explorer resources for optimal cost
• Reduce Data Explorer table cache policy to optimize costs
• Unused Data Explorer resources with data
• Cleanup unused storage in Data Explorer resources
• Enable optimized autoscale for Data Explorer resources

Network
• Delete ExpressRoute circuits in the provider status of Not Provisioned
• Repurpose or delete idle virtual network gateways

Recovery Services
• Use differential or incremental backup for database workloads

Storage
• Revisit retention policy for classic log data in storage accounts

CDW PEOPLE WHO GET IT

Page 1

FIG. 5A

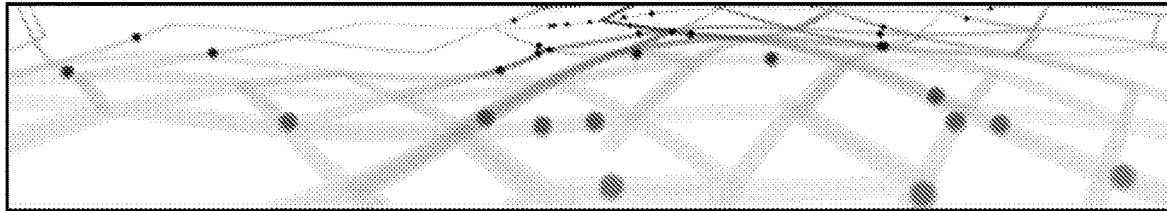

Reserved Instances
- Configure automatic renewal for your expiring reservation
- Buy virtual machine reserved instances to save money over pay-as-you-go costs
- Consider Cosmos DB reserved instance to save over your pay-as-you-go costs
- Consider SQL PaaS DB reserved instance to save over your pay-as-you-go costs
- Consider App Service stamp fee reserved instance to save over your on-demand costs
- Consider Database for MariaDB reserved instance to save over your pay-as-you-go costs
- Consider Database for MySQL reserved instance to save over your pay-as-you-go costs
- Consider Database for PostgreSQL reserved instance to save over your pay-as-you-go costs
- Consider Cache for Redis reserved instance to save over your pay-as-you-go costs
- Consider Azure Synapse Analytics (formerly SQL DW) reserved instance to save over your pay-as-you-go costs
- (preview) Consider Blob storage reserved instance to save on Blob v2 and Datalake storage Gen2 costs
- (preview) Consider Azure Data explorer reserved capacity to save over your pay-as-you-go costs
- Consider Azure Dedicated Host reserved instance to save over your on-demand costs
- Consider Data Factory reserved instance to save over your on-demand costs
- Consider Azure Data Explorer reserved instance to save over you on-demand costs
- Consider Azure Files reserved instance to save over your on-demand costs
- Consider Azure VMware Solution reserved instance to save over your on-demand costs
- (preview) Consider Databricks reserved capacity to save over your on-demand costs
- Consider NetApp Storage reserved instance to save over your on-demand costs
- Consider Azure Managed Disk reserved instance to save over your on-demand costs
- Consider Red Hat reserved instance to save over your on-demand costs
- Consider RedHat Osa reserved Instance to save over your on-demand costs
- Consider SapHana reserved instance to save over your on-demand costs
- Consider SuseLinux reserved instance to save over your on-demand costs
- Consider VMware Cloud Simple reserved instance
- Use virtual Machines with Ephemeral OS Disk enabled to save cost and get better performance Synapse
- Consider enabling autopause feature on Spark compute
- Consider enabling autoscale feature on Spark compute

MICROSOFT OPERATIONAL EXCELLENCE RECOMMENDATIONS
Inscape helps you optimize process and workflow efficiency, resource manageability, and deployment best practices with these operational excellence recommendations for your Azure environment:

Spring Cloud
- Update your outdated Azure Spring Cloud SDK to the latest version
- Update Azure Spring Cloud API Version

Automation
- Upgrade to Start/Stop VMs v2

Batch
- Recreate your pool to get the latest node agent features and fixes
- Delete and recreate your pool to remove a deprecated internal component
- Upgrade to the latest API version to ensure your Batch account remains operational
- Delete and recreate your pool using a VM size that will soon be retired
- Recreate your pool with a new image Page 2

CDW PEOPLE WHO GET IT

FIG. 5B

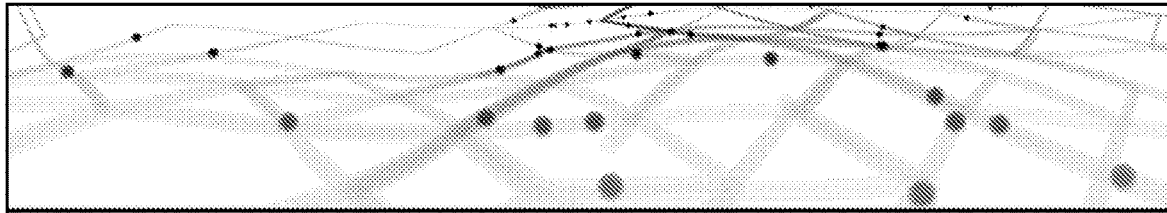

Cognitive Service
• Recreate your pool to get the latest node agent features and fixes

Compute
• Increase the number of compute resources you can deploy by 10 vCPU
• Add Azure Monitor to your virtual machine (VM) labeled as production
• Excessive NTP client traffic caused by frequent DNS lookups and NTP sync for new servers, which happens often on some global NTP servers
• An Azure environment update has been rolled out that may affect your Checkpoint Firewall
• The iControl REST interface has an unauthenticated remote command execution vulnerability
• NVA Accelerated Networking enabled but potentially not working
• Upgrade Citrix load balancers to avoid connectivity issues during NIC maintenance operations

Kubernetes
• Update cluster's service principal
• Monitoring addon workspace is deleted
• Deprecated Kubernetes API in 1.16 is found
• Enable the Cluster Autoscaler
• The AKS node pool subnet is full
• Disable the application Routing Addon
• Use ephemeral OS disk
• Use Uptime SLA
• Deprecated Kubernetes API in 1.22 has been found

Desktop Virtualization
• Permissions missing for start VM on connect
• No validation environment enabled
• Not enough production environments enabled

Cosmos DB
• Migrate Azure Cosmos DB attachments to Azure Blob Storage
• Improve resiliency by migrating your Azure Cosmos DB accounts to continuous backup

Insights
• Repair your log alert rule
• Log alert rule was disabled

Key Vault
• Create a backup of HSM

Data Explorer
• Reduce the cache policy on your Data Explorer tables

Networking
• Resolve Azure Key Vault issue for your Application Gateway
• Application Gateway does not have enough capacity to scale out
• Enable Traffic Analytics to view insights into traffic patterns across Azure resources

SQL Virtual Machine
• SQL IaaS Agent should be installed in full mode

Storage
• Prevent hitting subscription limit for maximum storage accounts
• Update to newer releases of the Storage Java v12 SDK for better reliability

Subscription
• Set up staging environments in Azure App Service
• Enforce 'Add or replace a tag on resources' using Azure Policy
• Enforce 'Allowed locations' using Azure Policy
• Enforce 'Audit VMs that do not use managed disks' using Azure Policy
• Enforce 'Allowed virtual machine SKUs' using Azure Policy
• Enforce 'Inherit a tag from the resource group' using Azure Policy
• Use Azure Lighthouse to simply and securely manage customer subscriptions at scale

Web
• Set up staging environments in Azure app Service

FIG. 5C

MICROSOFT PERFORMANCE RECOMMENDATIONS

The performance recommendations in Inscape can help improve the speed and responsiveness of your business-critical applications. These are the areas of performance that Inscape can recommend:

Attestation
- Update Attestation API version

Azure VMware Solution
- vSAN capacity utilization has crossed critical threshold

Azure Cache for Redis
- Improve your Cache and application performance when running with high network bandwidth
- Improve your Cache and application performance when running with many connected clients
- Improve your Cache and application performance when running with high server load
- Improve your Cache and application performance when running with high memory pressure

Cognitive Service
- Upgrade to the latest Cognitive Service Text Analytics API version
- Upgrade to the latest API version of Azure Cognitive Service for Language
- Upgrade to the latest Cognitive Service Text Analytics SDK version
- Upgrade to the latest Cognitive Service Language SDK version

Communication services
- Use recommended version of Chat SDK
- Use recommended version of Resource Manager SDK
- Use recommended version of Identity SDK
- Use recommended version of SMS SDK
- Use recommended version of Phone Numbers SDK
- Use recommended version of Calling SDK
- Use recommended version of Call Automation SDK
- Use recommended version of Network Traversal SDK

Kubernetes
- Unsupported Kubernetes version is detected

Data Factory
- Review your throttled Data Factory Triggers

Desktop Virtualization
- Improve user experience and connectivity by deploying VMs closer to user's location
- Change the max session limit for your depth first load balanced host pool to improve VM performance

Compute
- Improve user experience and connectivity by deploying VMs closer to user's location
- Consider increasing the size of your NVA to address persistent high CPU
- Use Managed disks to prevent disk I/O throttling
- Convert Managed Disks from Standard HDD to Premium SSD for performance
- Enable Accelerated Networking to improve network performance and latency
- Use SSD Disks for your production workloads
- Barracuda Networks NextGen Firewall may experience high CPU utilization, reduced throughput and high latency
- Arista Networks vEOS Router may experience high CPU utilization, reduced throughput and high latency
- Cisco Cloud Services Router 1000V may experience high CPU utilization, reduced throughput and high latency
- Palo Alto Networks VM-Series Firewall may experience high CPU utilization, reduced throughput and high latency
- NetApp Cloud Volumes ONTAP may experience high CPU utilization, reduced throughput and high latency
- Match production Virtual Machines with Production Disk for consistent performance and better latency
- Update to the latest version of your Arista VEOS product for Accelerated Networking support
- Update to the latest version of your Barracuda NG Firewall product for Accelerated Networking Support
- Update to the latest version of your Cisco Cloud Services Router 1000V product for Accelerated Networking support
- Update to the latest version of your F5Bigip product for Accelerated Networking support
- Update to the latest version of your NetApp product for Accelerated Networking support

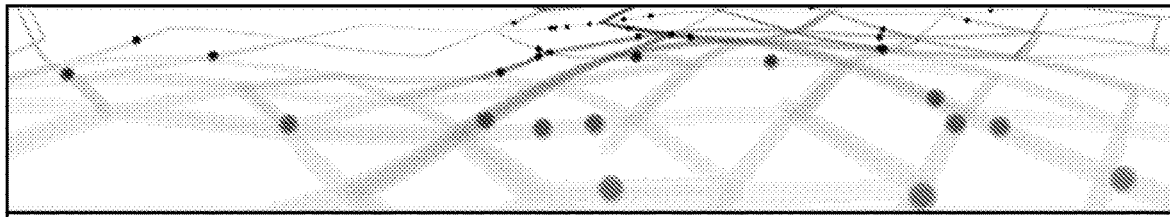

Cosmos DB
- Configure your Azure Cosmos DB applications to use Diret connectivity in the SDK
- Configure your Azure Cosmos DB query page size (MaxItemCount) to -1
- Add composite indexes to your Azure Cosmos DB container
- Optimize your Azure Cosmos DB indexing policy to only index what's needed
- Use hierarchical partition keys for optimal data distribution

Key Vault
- Update Key Vault SDK Version

HD Insight
- Reads happen on most recent data
- Consider using Accelerated Writes feature in your HBase cluster to improve cluster performance
- More than 75% of your queries are full scan queries
- Check your region counts as you have blocking updates
- Consider increasing the flusher threads
- Consider increasing your compaction threads for compactions to complete faster

Data Explorer
- Right-size Data Explorer resources for optimal performance
- Review table cache policies for Data Explorer tables
- Reduce Data Explorer table cache policy for better performance

Networking
- Configure DNS Time to Live to 20 seconds
- Configure DNS Time to Live to 60 seconds
- Upgrade your Express Route circuit bandwidth to accommodate your bandwidth needs
- Consider increasing the size of your VNet Gateway SKU to address consistently high CPU use
- Consider increasing the size of your VNet Gateway SKU to address high P2S use
- Make sure you have enough instances in your Application Gateway to support your traffic

SQL
- Create Statistics on table columns
- Remove data skew to increase query performance
- Update statistics on table columns
- Right-size overutilized SQL Databases
- Scale up to optimize cache utilization with SQL Data Warehouse
- Scale up or update resource class to reduce tempdb contention with SQL Data Warehouse
- Convert tables to replicated tables with SQL Data Warehouse
- Split staged files in the storage account to increase load performance
- Increase batch size when loading to maximize load throughput, data compression, and query performance
- Co-locate the storage account within the same region to minimize latency when loading

Storage
- Use "Put Blob" for blobs smaller than 256 MB
- Upgrade your Storage Client Library to the latest version for better reliability and performance
- Upgrade to Standard SSD Disks for consistent and improved performance
- Upgrade your Storage Client Library to the latest version for better reliability and performance
- Use premium performance block blob storage
- Convert Unmanaged Disks from Standard HDD to Premium SSD for performance
- No Snapshots Detected

Synapse
- Tables with Clustered Columnstore Indexes (CCI) with less than 60 million rows
- Update SynapseManagementClient SDK Version

Web
- Move your App Service Plan to PremiumV2 for better performance
- Check outbound connections from your App Service resource

Page 6

FIG. 5F

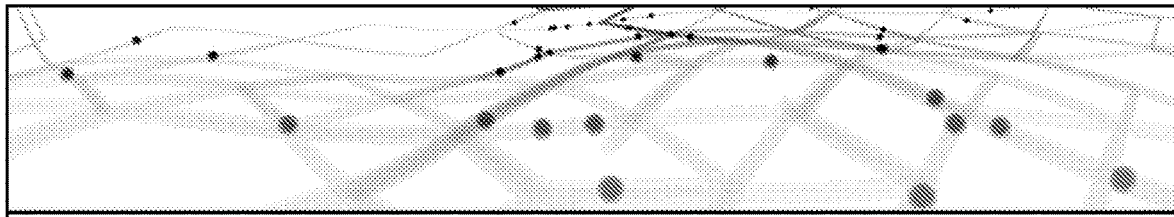

MICROSOFT RELIABILITY RECOMMENDATIONS

Inscape helps you ensure and improve the continuity of your business-critical applications. You can get reliability recommendations, including:

Farm Beats
- Upgrade to the latest FarmBeats API version
- API Management
- Hostname certificate rotation failed
- SSL/TLS renegotiation blocked

Cache
- Availability may be impacted from high memory fragmentation. Increase fragmentation memory reservation to avoid potential impact

Compute
- Enable Backups on your Virtual Machines
- Upgrade the standard disks attached to your premium-capable VM to premium disks
- Enable virtual machine replication to protect your applications from regional outage
- Upgrade VM from Premium Unmanaged Disks to Managed Disks at no additional cost
- Update your outbound connectivity protocol to Service Tags for Azure Site Recovery
- Use Managed Disks to improve data reliability
- Check Point Virtual Machine may lose Network Connectivity
- Access to mandatory URLs missing for your Azure Virtual Desktop environment

PostgreSQL
- Improve PostgreSQL availability by removing inactive logical replication slots

IoT Hub
- Upgrade device client SDK to a supported version for IotHub

Fluid Relay
- Upgrade your Azure Fluid Relay client library

Cosmos DB
- Configure Consistent indexing mode on your Azure Cosmos container
- Upgrade your old Azure Cosmos DB SDK to the latest version
- Upgrade your outdated Azure Cosmos DB SDK to the latest version
- Configure your Azure Cosmos DB containers with a partition key
- Upgrade your Azure Cosmos DB API for MongoDB account to v4.0 to save on query/storage costs and utilize new features
- Add a second region to your production workloads on Azure Cosmos DB
- Enable Server Side Retry (SSR) on your Azure Cosmos DB's API for MongoDB account
- Migrate your Azure Cosmos DB API for MongoDB account to v4.0 to save on query/storage costs and utilize new features
- Your Cosmos DB account is unable to access its linked Azure Key Vault hosting your encryption key
- Avoid being rate limited from metadata operations
- Use the new 3.6+ endpoint to connect to your upgraded Azure Cosmos DB's API for MongoDB account
- Upgrade to 2.6.14 version of the Async Java SDK v2 to avoid a critical issue or upgrade to Java SDK v4 as Async Java SDK v2 is being deprecated
- Upgrade to the current recommended version of the Java SDK v4 to avoid a critical issue

HD Insight
- Deprecation of Kafka 1.1 in HDInsight 4.0 Kafka cluster
- Deprecation of Older Spark Versions in HDInsight spark cluster
- Enable critical updates to be applied to your HDInsight clusters
- Drop and recreate your HDInsight clusters to apply critical updates
- Apply critical updates to your HDInsight clusters
- Action required: Migrate your A8-A11 HDInsight cluster before 1 March 2021

FIG. 5G

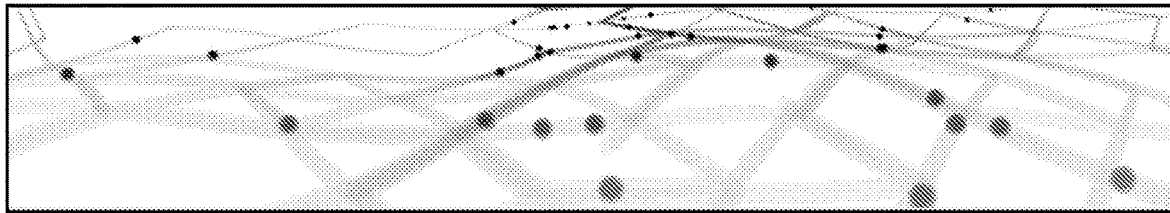

Hybrid Compute
• Upgrade to the latest version of the Azure Connected Machine agent

Kubernetes
• Pod Disruption Budgets Recommended
• Upgrade to the latest agent version of Azure Arc-enabled Kubernetes

Media Services
• Increase Media Services quotas or limits to ensure continuity of service

Recovery Services
• Enable soft delete for your Recovery Services vaults
• Enable Cross Region Restore for your recovery Services Vault

Networking
• Upgrade your SKU or add more instances to ensure fault tolerance
• Move to production gateway SKUs from Basic gateways
• Add at least one more endpoint to the profile, preferably in another Azure region
• Add an endpoint configured to "All (World)"
• Add or move an endpoint to another Azure region
• Implement multiple ExpressRoute circuits in your Virtual Network for cross premises resiliency
• Implement ExpressRoute Monitor on Network Performance Monitor for end-to-end monitoring of your ExpressRoute circuit
• Avoid hostname override to ensure site integrity
• Use ExpressRoute Global Reach to improve your design for disaster recovery
• Azure WAF RuleSet CRS 3.1/3.2 has been updated with log4j2 vulnerability rule
• Additional protection to mitigate Log4j2 vulnerability (CVE-2021-44228)
• Enable Active-Active gateways for redundancy

Search
• You are close to exceeding storage quota of 2GB. Create a Standard search service
• You are close to exceeding storage quota of 50MB Create a Basic or Standard search service
• You are close to exceeding your available storage quota. Add additional partitions if you need more storage

Storage
• Enable Soft Delete to protect your blob data
• Use Managed Disks for storage accounts reaching capacity limit

Web
• Consider scaling out your APP Service Plan to avoid CPU exhaustion
• Fix the backup database settings of your APP Service resource
• Consider scaling up your APP Service Plan SKU to avoid memory exhaustion
• Scale up your App Service resource to remove the quota limit
• Use deployment slots for your App Service resource
• Fix the backup storage settings of your App Service resource
• Move your App Service resource to Standard or higher and use deployment slots
• Consider scaling out your App Service Plan to optimize user experience and availability
• Consider upgrading the hosting plan of the Static Web App(s) in this subscription to Standard SKU
• Application code should be fixed as work process crashed due to Unhandled Exception

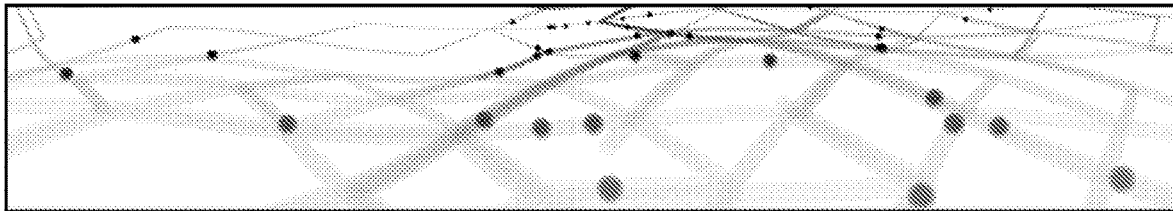

MICROSOFT SECURITY RECOMMENDATIONS FOR APPSERVICES

- API App Should only be accessible over HTTPS
- CORS should not al every resource to access API Apps
- CORS should not al every resource to access Function Apps
- CORS should not al every resource to access Web Applications
- Diagnostic logs in App Service should be enabled
- Ensure API app has Client Certificates Incoming client certificates set to On
- FTPS should be required in API apps
- FTPS should be required in function apps
- FTPS should be required in web apps
- Function App should only be accessible over HTTPS
- Function apps should have Client Certificates (Incoming client certificates) enabled
- Java should be updated to the latest version for API apps
- Java should be updated to the latest version for function apps
- Java should be updated to the latest version for web apps
- Managed identity should be used in API apps
- Managed identity should be used in function apps
- Managed identity should be used in web apps
- Microsoft Defender for App Service should be enabled
- PHP should be updated to the latest version for API apps
- PHP should be updated to the latest version for web apps
- Python should be updated to the latest version for API apps
- Python should be updated to the latest version for function apps
- Python should be updated to the latest version for web apps
- Remote debugging should be turned off for API App
- Remote debugging should be turned off for Function App
- Remote debugging should be turned off for Web Applications

- TLS should be updated to the latest version for API apps
- TLS should be updated to the latest version for function apps
- TLS should be updated to the latest version for web apps
- Web Application should only be accessible over HTTPS
- Web apps should request an SSL certificate for all incoming requests

MICROSOFT SECURITY RECOMMENDATIONS FOR COMPUTE

- Adaptive application controls for defining safe applications should be enabled on your machines
- Allowlist rules in your adaptive application control policy should be updated
- Authentication to Linux machines should require SSG keys
- Automation account variables should be encrypted
- Azure Backup should be enabled for virtual machines
- Container hosts should be configured securely
- Diagnostic logs in Azure Stream Analytics should be enabled
- Diagnostic logs in Batch accounts should be enabled
- Diagnostic logs in Event Hub should be enabled
- Diagnostic logs in Kubernetes services should be enabled
- Diagnostic logs in Logic Apps should be enabled
- Diagnostic logs in Service Bus should be enabled
- Diagnostic logs in Virtual Machine Scale Sets should be enabled
- Endpoint protection health issues on machines should be resolved
- Endpoint protection should be installed on machines
- Endpoint protection should be installed on virtual machine scale sets
- File integrity monitoring should be enabled on servers

CDW PEOPLE WHO GET IT

Page 9

FIG. 5I

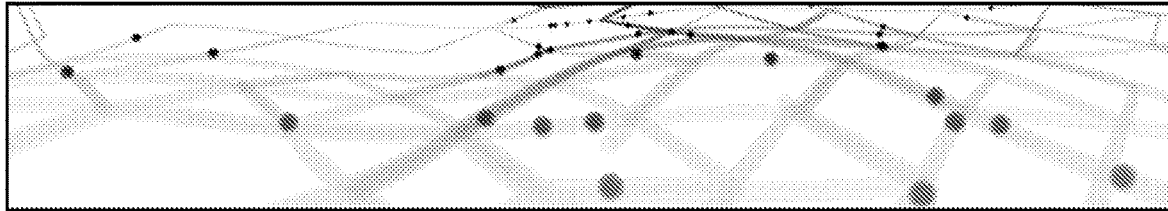

- Guest Attestation extension should be installed on supported Linux virtual machine scale sets
- Guest Attestation extension should be installed on supported Linux virtual machines
- Guest Attestation extension should be installed on supported Windows virtual machine scale sets
- Guest Attestation extension should be installed on supported Windows virtual machines
- Guest Configuration extension should be installed on machines
- Install endpoint protection solution on virtual machines
- Linux virtual machines should enforce kernel module signature validation
- Linux virtual machines should use only signed and trusted boot components
- Linux virtual machines should use Secure Boot
- Log Analytics agent should be installed on Linux-based Azure Arc-enabled machines
- Log Analytics agent should be installed on virtual machine scale sets
- Log Analytics agent should be installed on virtual machines
- Log Analytics agent should be installed on Windows-based Azure Arc-enabled machines
- Machines should be configured securely
- Machines should be restarted to apply security configuration updates
- Machines should have a vulnerability assessment solution
- Machines should have vulnerability findings resolved
- Management ports of virtual machines should be protected with just-in-time network access control
- Microsoft Defender for servers should be enabled
- Microsoft Defender for servers should be enabled on workspaces
- Pod Security Policies should be defined on Kubernetes Services (Deprecated)
- Running container images should have vulnerability findings resolved

- Secure Boot should be enabled on supported Windows virtual machines
- Service Fabric clusters should have the ClusterProtectionLevel property set to EncryptAndSign
- Service Fabric clusters should only use Azure Active Directory for client authentication
- System updates on virtual machine scale sets should be installed
- System updates should be installed on your machines
- System updates should be installed on your machines (powered by Update Center)
- Virtual machine scale sets should be configured securely
- Virtual machines guest attestation status should be healthy
- Virtual machines' Guest Configuration extension should be deployed with system-assigned managed identity
- Virtual machines should be migrated to new Azure Resource Manager resources
- Virtual machines should encrypt temp disks, caches, and data flows between Compute and Storage resources
- vTPM should be enabled on supported virtual machines
- Vulnerabilities in security configuration on your Linux machines should be remediated (powered by Guest Configuration)
- Vulnerabilities in security configuration on your Windows machines should be remediated (powered by Guest Configuration)
- Windows Defender Exploit Guard should be enabled on machines
- Windows web servers should be configured to use secure communication protocols

FIG. 5J

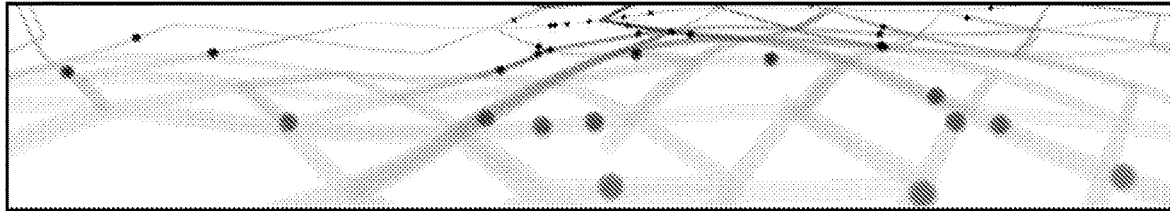

MICROSOFT SECURITY RECOMMENDATIONS FOR CONTAINERS

- Container registries should be encrypted with a customer-managed key (CMK)
- Azure Arc-enabled Kubernetes clusters should have the Azure Policy extension installed
- Azure Kubernetes Service clusters should have the Azure Policy add-on for Kubernetes installed
- Container CPU and memory limits should be enforced
- Container images should be deployed from trusted registries only
- Container registries should not allow unrestricted network access
- Container registries should use private link
- Container registry images should have vulnerability findings resolved
- Container with privilege escalation should be avoided
- Containers sharing sensitive host namespaces should be avoided
- Containers should listen on allowed ports only
- Containers should only use allows AppArmor profiles
- Immutable (read-only) root filesystem should be enforced for containers
- Kubernetes API server should be configured with restricted access
- Kubernetes clusters should be accessible only over HTTPS
- Kubernetes clusters should gate deployment of vulnerable images
- Lease privileged Linux capabilities should be enforced for containers
- Microsoft Defender for Containers should be enabled
- Privileged containers should be avoided
- Role-Based Access Control should be used on Kubernetes Services
- Running containers as root user should be avoided
- Services should list on allowed ports only
- Usage of host networking and ports should be restricted
- Usage of pod HostPath volume mounts should be restricted to a known list to restrict node access from compromised containers

MICROSOFT SECURITY RECOMMENDATIONS FOR DATA

- Azure Cosmos DB accounts should use customer-managed keys to encrypt data at rest
- Azure Machine Learning workspaces should be encrypted with a customer-managed key (CMK)
- Cognitive Services accounts should enable data encryption with a customer-managed key (CMK)
- MySQL servers should use customer-managed keys to encrypt data at rest
- PostgreSQL servers should use customer-managed keys to encrypt data at rest
- SQL managed instances should use customer-managed keys to encrypt data at rest
- SQL servers should use customer-managed keys to encrypt data at rest
- Storage accounts should use customer-managed key (CMK) for encryption
- All advanced threat protection types should be enabled in SQL managed instance advanced data security settings
- All advanced threat protection types should be enabled in SQL server advanced data security settings
- API Management services should use a virtual network
- App Configuration should use private link
- Audit retention for SQL servers should be set to at least 90 days
- Auditing on SQL server should be enabled
- Auto provisioning of the Log Analytics agent should be enabled on subscriptions
- Azure Arc-enabled Kubernetes clusters should have the Defender extension installed
- Azure Cache for Redis should reside within a virtual network
- Azure Cosmos DB accounts should have firewall rules
- Azure Event Grid domains should use private link
- Azure Event Grid topics should use private link
- Azure Kubernetes Service clusters should have Defender profile enabled

- Azure Machine learning workspaces should use private link
- Azure SignalR Service should use private link
- Azure Spring Cloud should use network injection
- Cognitive Services accounts should enable data encryption
- Cognitive Services accounts should restrict network access
- Cognitive Services accounts should use customer owned storage or enable data encryption
- Diagnostic logs in Azure Data Lake Store should be enabled
- Diagnostic logs in Data Lake Analytics should be enabled
- Email notification for high severity alerts should be enabled
- Email notification to subscription owner for high severity alerts should be enabled
- Enforce SSL connection should be enabled for MySQL database servers
- Enforce SSL connection should be enabled for PostgreSQL database servers
- Geo-redundant backup should be enabled for Azure Database for MariaDB
- Geo-redundant backup should be enabled for Azure Database for MySQL
- Geo-redundant backup should be enabled for Azure Database for PostgreSQL
- Kubernetes clusters should disable automounting API credentials
- Kubernetes clusters should not grant CAPSYSADMIN security capabilities
- Kubernetes clusters should not use the default naespace
- Microsoft Defender for Azure SQL Database servers should be enabled
- Microsoft Defender for DNS should be enabled
- Microsoft Defender for open-source relational databases should be enabled
- Microsoft Defender for Resource Manager should be enabled
- Microsoft Defender for SQL on machines should be enabled on workspaces
- Microsoft Defender for SQL servers on machines should be enabled
- Microsoft Defender for SQL should enabled for unprotected Azure SQL servers
- Microsoft Defender for SQL should be enabled for unprotected SQL Managed Instances

- Microsoft Defender for Storage should be enabled
- Network Watcher should be enabled
- Private endpoint connections on Azure SQL Database should be enabled
- Private endpoint should be enabled for MariaDB servers
- Private endpoint should be enabled for MySQL servers
- Private endpoint should be enabled for PostgreSQL servers
- Public network access on Azure SQL Database should be disabled
- Public network access should be disabled for Cognitive Services accounts
- Public network access should be disabled for Maria DB servers
- Public network access should be disabled for MySQL servers
- Public network access should be disabled for PostgreSQL servers
- Redis Cache should allow access only via SSL
- SQL databases should have vulnerability findings resolved
- SQL managed instances should have vulnerability assessment configured
- SQL servers on machines should have vulnerability findings resolved
- SQL servers should have an Azure Active Directory administrator provisioned
- SQL servers should have vulnerability assessment configured
- Storage account should use a private link connection
- Storage accounts should be migrated to new Azure Resource Manager resources
- Storage accounts should restrict network access using virtual network rules
- Subscriptions should have a contact email address for security issues
- Transparent Data Encryption on SQL databases should be enabled
- VM Image Builder templates should use private link
- Web Application Firewall (WAF) should be enabled for Application Gateway
- Web application Firewall (WAF) should be enabled for Azure Front Door Service service

Page 12

FIG. 5L

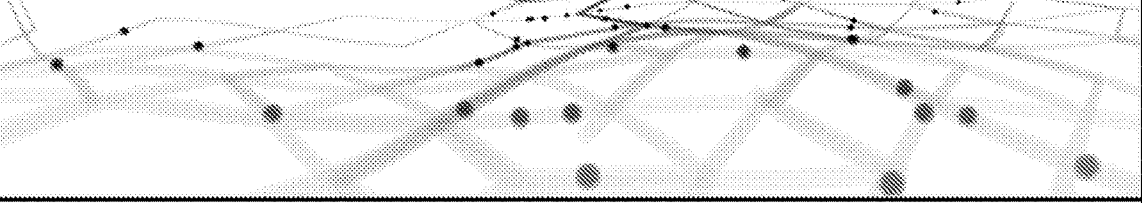

AWS COST OPTIMIZATION RECOMMENDATIONS
- Amazon comprehend Underutilized Endpoints
- Amazon EC2 instances consolidation for Microsoft SQL Server
- Amazon EC2 instances over-provisioned for Microsoft SQL Server
- Amazon EC2 Reserved Instance Lease Expiration
- Amazon EC2 Reserved Instance Optimization
- Amazon ElastiCache Reserved Node Optimization
- Amazon OpenSearch Service Reserved Instance Optimization
- Amazon RDS Idle DB Instances
- Amazon Redshift Reserved Node Optimization
- Amazon Relational Database Service (RDS) Reserved Instance Optimization
- Amazon Route 53 Latency Resource Record Sets
- AWS Lambda Functions with Excessive Timeouts
- AWS Lambda Functions with High Error Rates
- AWS Well-Architected high risk issues for cost optimization
- Idle Load Balancers
- Low Utilization Amazon EC2 Instances
- Savings Plan
- Unassociated Elastic IP Addresses
- Underutilized Amazon EBS Volumes
- Underutilized Amazon Redshift Clusters

AWS PERFORMANCE RECOMMENDATIONS
- Amazon EBS Provisioned IOPS (SSD) Volume Attachment Configuration
- Amazon EC2 to EBS Throughput Optimization
- Amazon Route 53 Alias Resource Record Sets
- AWS Well-Architected high risk issues for performance
- CloudFront Alternate Domain Names
- CloudFront Content Delivery Optimization
- CloudFront Header Forwarding and Cache Hit Ratio
- High Utilization Amazon EC2 Instances
- Large Number of EC2 Security Group Rules Applied to an Instance
- Large Number of Rules in an EC2 Security Group
- verutilized Amazon EBS Magnetic Volumes

AWS SECURITY RECOMMENDATIONS
- Amazon EC2 instances with Microsoft SQL Server end of support
- Amazon EBS Public Snapshots
- Amazon RDS Public Snapshots
- Amazon RDS Security Group Access Risk
- Amazon Route 53 MX Resource Record Sets and Sender Policy Framework
- Amazon S3 Bucket Permissions
- AWS CloudTrail Logging
- AWS Lambda Functions Using Deprecated Runtimes
- AWS Well-Architected high risk issues for security
- CloudFront Custom SSL Certificates in the IAM Certificate Store
- CloudFront SSL Certificate on the Origin Server
- ELB Listener Security
- ELB Security Groups
- Exposed Access Keys
- IAM Access Key Rotation
- IAM Password Policy
- IAM Use
- MFA on Root Account
- Security Groups – Specific Ports Unrestricted
- Security Groups – Unrestricted Access

AWS FAULT TOLERANCE RECOMMENDATIONS
- Amazon Aurora DB Instance Accessibility
- Amazon Comprehend endpoint Access Risk
- Amazon EBS Snapshots
- Amazon EC2 Availability Zone Balance
- Amazon RDS Backups
- Amazon RDS Multi-AZ
- Amazon Route 53 Deleted Health Checks

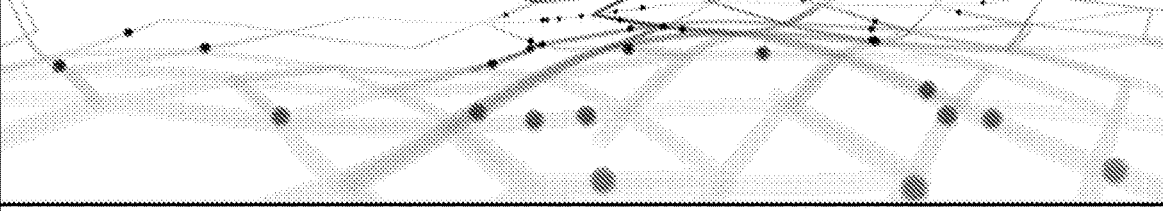

- Amazon Route 53 Failover Resource Record Sets
- Amazon Route 53 High TTL Resource Record Sets
- Amazon Route 53 Name Server Delegations
- Amazon S3 Bucket Logging
- Amazon S3 Bucket Versioning
- Auto Scaling Group Health Check
- Auto Scaling Group Resources
- AWS Direct Connect Connection Redundancy
- AWS Direct Connect Location Redundancy
- AWS Direct Connect Virtual Interface Redundancy
- AWS Lambda VPS-enabled Functions without Multi-AZ Redundance
- AWS Well-Architected high risk issues for reliability
- ELB Connection Draining
- ELB Cross-Zone Load Balancing
- Load Balancer Optimization
- VPN Tunnel Redundancy

AWS SERVICE LIMITS RECOMMENDATIONS
- Auto Scaling Groups
- Auto Scaling Launch configurations
- CloudFormation Stacks
- DynamoDB Read Capacity
- DynamoDB Write Capacity
- EBS Active Snapshots
- EBS Cold HDD (sc1) Volume Storage
- EBS General Purpose SSD (gp2) Volume Storage
- EBS General Purpose SSD (gp3) Volume Storage
- EBS Magnetic (standard) Volume Storage
- EBS Provisioned IOPS (SSD) Volume Aggregate IOPS
- EBS Provisioned IOPS SSD (io1) Volume Storage
- EBS Provisioned IOPS SSD (io2) Volume Storage
- EBS Throughput Optimized HDD (st1) Volume Storage
- EC2 On-Demand Instances
- EC2 Reserved Instance Leases

- EC2-Classic Elastic IP Addresses
- EC2-VPS Elastic IP Address
- ELB Application Load Balancers
- ELB Classic Load Balancers
- ELB Network Load Balancers
- IAM Group
- IAM Instance Profiles
- IAM Policies
- IAM Roles
- IAM Server Certificates
- IAM Users
- Kinesis Shards per Region
- RDS Cluster Parameter Groups
- RDS Cluster Roles
- RDS Clusters
- RDS DB Instances
- RDS DB Manual Snapshots
- RDS DB Parameter Groups
- RDS DB Security Groups
- RDS Event Subscriptions
- RDS Max Auths per Security Group
- RDS Option Groups
- RDS Read Replicas per Master
- RDS Reserved Instances
- RDS Subnet Groups
- RDS Subnets per Subnet Group
- RDS Total Storage Quota
- Route 53 Hosted Zones
- Route 53 Max Health Checks
- Route 53 Reusable Delegation Sets
- Route 53 Traffic Policies
- Route 53 Traffic Policy Instances
- SES Daily Sending Quota
- VPC
- VPC Internet Gateways

```
Recommendation Engine Rules = {  ────512
        Microsoft Cost Savings => {  ────516-A
518-A ──── Compute => {  ────520-A
              Standard Storage => 0.0015879,
       524 ── Right-size VM => 0.0036579,  ──── 526
              Detach unused => 0.000565498,
            },
518-B ──── MariaDB => {  ────520-B
              Right-size underutilized MariaDB => 0.0002549,
            },
518-C ──── MySQL => {  ────520-C
              Right-size underutilized MySQL=> 0.00026879,
            },
518-D ──── PostgreSQL => {  ────520-D
              Right-size underutilized PostgreSQL => 0.0001868,
            },
518-E ──── CosmosDB => {  ────520-E
              Review free tier account => 0.0003578,
              Act on containers => 0.00026571,
              Enable autoscaler => 0.00108876,
              Configure manual throughput => 0.00088798,
            },
518-F ──── Data Explorer => {  ────520-F
              Unused/empty review => 0.0006578,
              Right - size data explorer => 0.008749843,
              Reduce table cache => 0.007887658,
              Unused resources review => 0.00088798,
              Cleanup unused storage => 0.00108876,
              Enable autoscaler => 0.00088798,
            },
518-G ──── Network => {  ────520-G
              Delete ExpressRoute circuits => 0.0546548,
              Repurpose idle gateways => 0.0548778,
            },
518-H ──── Recovery services => {  ────520-H
              Use differential backup => 0.0579863,
            },
518-I ──── Storage => {  ────520-I
              Revisit retention policy => 0.0354797,
            },
        },                                        516-B
        Microsoft Operational Excellence => {..., ..., ...},
}
```

Parameters
Parameters are defined in your template and allow you to input custom values when you create or update a stack.

AutoDeploymentEnabled
If set to true, StackSets automatically deploys additional stack instances to AWS Organizations account that are added to a target organization or organizational unit (OU) in the specific Regions. If an account is removed from a target organization or OU, StackSets deletes stack instances from the account in the specific Regios.

| true |

Environment
Environment in which the inscape prerequisites are being deployed to

| Prod ▶ |

FailureToleranceCount
The number of accounts, per Region, for which this operation can fail before AWS CloudFormation stops the operation in that Region. If the operation is stopped in a Region, AWS CloudFormation doesn't attempt the operation in any subsequent Regions.

|  |

MaxConcurrentCount
The maximum number of accounts in which to perform this operation at one time. This is dependent on the value of Failure ToleranceCount. MaxConcurrentCount is at most one more than the FailureToleranceCount. Note that this setting lets you specify the maximum for operations. For large deployments, under certaincircuimstances the actual number of accounts acted upon concurrently may be lower due to service throttling.

|  |

OUId
Organizational Unit (OU) IDs within the AWS organization. In order to list multiple OU's, please place a comma in between each OU-ID with no space

|  |

RetainStacksOnAccountRemoval
If set to true, stack resources are retained when an account is removed from a target organization or OU. If set to false, stack resources are deleted. Specify only if Enabled is set to True

| false |

ⓘ The following resource(s) require capabilities: [AWS::IAM::Role]

This template contains Identity and Access Management (IAM) resources. Check that you want to create each of these resources and that they have the minimum required permissions. In addition, they have custom names. Check that the custom names are unique within your AWS account. Learn more ☐

☑ I acknowledge that AWS CloudFormation might create IAM resources with custom names.

FIG. 7G

CLOUD MANAGEMENT

| Cloud | Year to date Spend | Last month Spend | Advisor Active Recommendations | VM Right-Sizing Active Recommendations |
|---|---|---|---|---|
| AWS | $33,805.92 | $9,422.38 | 0 | 0 |
| AZURE | $27.06 | $17.90 | 0 | 0 |
| GCP | $0.00 | $0.00 | 0 | 0 |
| Total | $33,832.97 | $9,440.28 | 0 | 0 |

900

Inscape
The art of cloud management.

Happy Coding CSG

AWS CLOUD MANAGEMENT ADVISOR AT A GLANCE

RECOMMENDATIONS BY CATEGORY

| Cost Optimization: 0 | Savings amount per month if resolved: $0 |
| --- | --- |
| Performance: 0 | Security: 0 |
| Service Limits: 0 | Fault Tolerance: 0 |

Inscape — The art of cloud management.

FIG. 9B

VM RIGHT-SIZING

920

| Cloud | Delete Recommendations | Resize Recommendations | Saving Amount if Resolved |
|---|---|---|---|
| Azure<br>VIRTUAL MACHINES: 0 | 0 | 0 | $0.00 |
| Aws<br>VIRTUAL MACHINES: 0 | 0 | 0 | $0.00 |
| Total<br>VIRTUAL MACHINES: {{TOTALVM}} | 0 | 0 | $0.00 |

CDW | Inscape
Inscape | The art of cloud management.

CLOUD MANAGEMENT MATURITY

Insights

Score: 50/100
YOU ARE WALKING

Ranking: 100%
YOU RANK 100% BETTER THAN OTHER INSCAPE CUSTOMERS

Three stages of maturity:

Crawling: We check if you have correctly configured cloud costs and provider recommendations for Inscape.

Walking: We check if your budgets cover all providers and if all accounts/subscriptions have access to recommendations.

Running: We check if your budgets cover all resources of all providers, and if you are actioning Inscape recommendations.

Actions:

We recommend that you follow the 1 unresolved maturity recommendations to increase your score.

Inscape
The art of cloud management.

Happing Coding CSG

ANOMALY AT A GLANCE

| Amazon Web Service (AWS): | Microsoft Azure: |
|---|---|
| 0 | 0 |

NOTIFICATIONS BY CLOUD

| Google Cloud Provider (GCP): | Total: |
|---|---|
| 0 | 0 |

Inscape
The art of cloud management.

PROVIDING CLOUD MATURITY SCORES FOR IMPROVING CLOUD COMPUTING HEALTH

TECHNICAL FIELD

The present disclosure is directed to improvements related to providing cloud maturity scores for improving cloud computing health. More particularly, the present disclosure is directed to using machine learning (ML) and artificial intelligence (AI)-based techniques to generate respective values for cloud computing criteria, and for calculating cloud maturity scores based on the respective values.

BACKGROUND

A multi-brand provider of information technology solutions to international customers in the business, government, education and healthcare industries may provide a broad array of products and services ranging from hardware and software to integrated information technology solutions such as security, cloud computing, hybrid infrastructure and digital experience.

Understanding cloud maturity in a multi-cloud environment is challenging for several reasons. First, in a multi-cloud environment, organizations typically use multiple cloud service providers (e.g., hyperscalers), each with distinctive features and functionality. These differences make it difficult to assess the overall status of the respective cloud environments, as each one may have distinctive features and functionality in specific areas. Second, integrating multiple cloud environments is complex, especially when it comes to interoperability and data exchange between different cloud services. It can be challenging to assess the maturity level of a multi-cloud environment that has multiple linked systems with varying respective levels of maturity.

Evolving technology presents another challenge. The continuously evolving features and capabilities being introduced regularly make assessing the maturity level of a multi-cloud environment difficult, as the environment's underlying structure, parameters, and functionality can change rapidly. In recent years, it has become particularly difficult for cloud computing clients to manage all of the disparate cloud and service management tools across various cloud providers, which each present different consoles, reports, invoices, recommendations, chargebacks, onboarding and offboarding.

Currently, information technology (IT)/cloud computing administrators have an average of 30 web tabs open to manage their 80+ cloud applications and multi-cloud providers. They are using "swivel chair integration" to get their job done, using these different applications/portals to get their reporting.

Further, cloud administrators at many companies are losing productivity while developing one-off shell scripts, sometimes in esoteric reporting languages, to attempt to determine their overall cloud spend and providing the necessary visibility into future budgeting and forecasting. Finance and accounting units need the ability to provide visibility, budgeting, and cloud cost allocation by line of business application or business unit. However, these groups are resorting to manually navigating and reconciling numerous and complex cloud and software invoicing, which does not provide chargeback/showback capabilities-resulting in numerous unproductive hours and employee dissatisfaction. There is also the challenge of being "surprised" by their cloud bill due to unplanned and unwanted consumption.

All of this leads to a situation in which a company using multiple cloud platforms lacks objective criteria to understand and reason about their cloud footprint in terms of cost, resource optimization, security, performance, etc. Further, the company lacks ways to compare such metrics against those of other companies in general, let alone companies in the same peer group. This leads to great uncertainty and opacity regarding allocation of resources and strategic planning. For example, customer challenges include inability measure progress in the financial operations of the cloud, inability to establish a baseline of where the company's cloud infrastructure, and inability to compare to others.

Accordingly, there is an opportunity for platforms and technologies for generating cloud maturity scores to improve cloud computing health, to enable users (e.g., cloud administrators, managers, etc.) to effectively track cloud infrastructure progress.

BRIEF SUMMARY

In one aspect a computing system for providing cloud maturity scores for improving cloud computing health includes one or more processors; an electronic network; and one or more memories having stored thereon computer-executable instructions that, when executed by the one or more processors, cause the computing system to: (i) receive cloud computing data from one or more hyperscaler instances; (ii) process the cloud computing data from the one or more hyperscaler instances to determine respective status information corresponding to the one or more hyperscalers; (iii) compare the respective status information to one or more rules in a rules data structure; (iv) generate one or more cloud maturity scores each corresponding to one of the one or more rules; and (v) transmit, via the electronic network, the one or more cloud maturity scores to a client computing device.

In another aspect, a computer-implemented method of providing cloud maturity scores for improving cloud computing health includes (i) receiving, via one or more processors, cloud computing data from one or more hyperscaler instances; (ii) processing, via one or more processors, the cloud computing data from the one or more hyperscaler instances to determine respective status information corresponding to the one or more hyperscalers; (iii) comparing, via one or more processors, the respective status information to one or more rules in a rules data structure; (iv) generating, based on the comparing, one or more cloud maturity scores each corresponding to one of the one or more rules; and (v) transmitting, via an electronic network, the one or more cloud maturity scores to a client computing device.

In yet another aspect, a computer-readable medium includes computer-executable instructions that, when executed, cause a computer to: (i) receive cloud computing data from one or more hyperscaler instances; (ii) process the cloud computing data from the one or more hyperscaler instances to determine respective status information corresponding to the one or more hyperscalers; (iii) compare the respective status information to one or more rules in a rules data structure; (iv) generate one or more cloud maturity scores each corresponding to one of the one or more rules; and (v) transmit, via the electronic network, the one or more cloud maturity scores to a client computing device.

BRIEF DESCRIPTION OF THE FIGURES

The figures described below depict various aspects of the system and methods disclosed therein. It should be understood that each figure depicts one aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

FIG. 3 depicts a block diagram of functionality provided by the exemplary cloud computing environment of FIG. 1A and/or FIG. 1B, according to some aspects.

FIG. 4A depicts a cloud management platform including a cloud environment maturity graphical user interface including exemplary numerical and categorical cloud maturity scores, according to some aspects.

FIG. 5A depicts cloud computing environment best practice rules, according to some aspects.

FIG. 5B depicts cloud computing environment best practice rules, according to some aspects.

FIG. 5C depicts cloud computing environment best practice rules, according to some aspects.

FIG. 5D depicts cloud computing environment best practice rules, according to some aspects.

FIG. 5F depicts cloud computing environment best practice rules, according to some aspects.

FIG. 5G depicts cloud computing environment best practice rules, according to some aspects.

FIG. 5H depicts cloud computing environment best practice rules, according to some aspects.

FIG. 5I depicts cloud computing environment best practice rules, according to some aspects.

FIG. 5J depicts cloud computing environment best practice rules, according to some aspects.

FIG. 5K depicts cloud computing environment best practice rules, according to some aspects.

FIG. 5L depicts cloud computing environment best practice rules, according to some aspects.

FIG. 5M depicts cloud computing environment best practice rules, according to some aspects.

FIG. 5N depicts cloud computing environment best practice rules, according to some aspects.

FIG. 5O depicts exemplary cloud computing rules including the best practices of FIGS. 5A-5N paired with respective weights, according to some aspects.

FIG. 6C depicts graphical user interfaces for accessing cloud computing access control resources, according to some aspects.

FIG. 7F depicts graphical user interfaces for accessing and deploying Identity Access Management (IAM) resources, according to some aspects.

FIG. 7G depicts graphical user interfaces for confirming access to IAM resources, according to some aspects.

FIG. 9A depicts an exemplary graphical user interface for displaying a multicloud management spending statistics and recommendations report, according to some aspects.

FIG. 9B depicts an exemplary graphical user interface for displaying a multicloud management potential spending savings/recommendations by category report, according to some aspects.

FIG. 9C depicts an exemplary graphical user interface for displaying a multicloud management spending statistics/virtual machine (VM) rightsizing recommendation report, according to some aspects.

FIG. 9D depicts an exemplary graphical user interface for displaying a multicloud management maturity score report, according to some aspects.

Figure 1A:
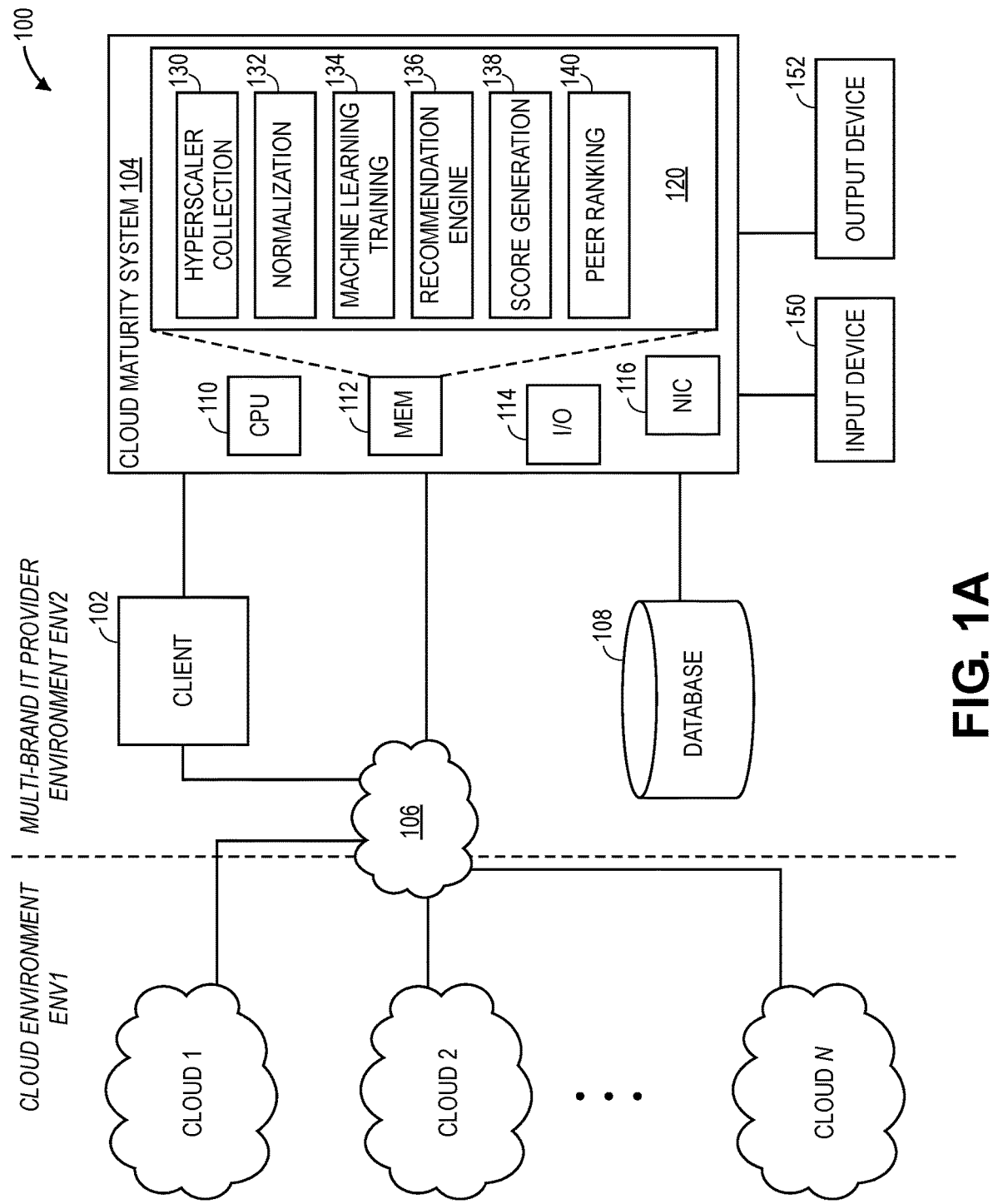
FIG. 1A depicts an exemplary computing environment for providing cloud maturity scores for improving cloud computing health, according to some aspects.

The figures depict preferred aspects for purposes of illustration only. One skilled in the art will readily recognize from the following discussion that alternative aspects of the systems and methods illustrated herein may be employed without departing from the principles of the invention described herein.

DETAILED DESCRIPTION

Overview

The present aspects may relate to, inter alia, providing cloud maturity scores for improving cloud computing health. In particular, the present techniques may include methods, systems and computer-readable media that are directed to using machine learning-based techniques to generate respective values for cloud computing criteria, and for calculating cloud maturity scores based on the respective values.

For example, the present techniques may be used within the Inscape platform, an all-encompassing Cloud Business Platform of service offerings to help cloud computing customers discover, manage, govern, report, optimize, adopt, train, and procure the most popular Infrastructure-as-a-Service (IaaS)/Platform-as-a-Service (PaaS) and/or Software-as-a-Service (SaaS) offerings and applications. Inscape consolidates many tools and services for cloud management into a single view. The present techniques may provide include a single management and reporting platform (Inscape Cloud & SaaS Management) for Microsoft 365, Microsoft Azure, Amazon Web Services (AWS), Google Cloud Platform (GCP) and/or others, with a roadmap that expands into selected hyperscalers and SaaS solutions.

The present techniques provide the ability to provision, procure, manage, report, and unify the cloud and managed services billings. Because the present techniques include all of this cloud computing functionality in a single user interface, the present techniques advantageously increase productivity, control cloud costs, and mitigate cloud risks for clients. continue to consume more of these services. The present techniques improve productivity by having all of the functionality currently spread across many different portals in one single site with the ultimate goal of providing zero IT touch task management (e.g., on/offboarding through payroll software integration).

Further, the present techniques increase the productivity of their cloud administrators, eliminating the need for scripting one-offs, and providing have better cloud and software management, understanding cloud usage and cost, plus performance tracking and benchmarking. The present techniques may provide a single consolidated cloud invoice that allows cloud service consumers to easily reconcile and charge to the associated department, or project. The present techniques may also include cloud cost anomaly detection aspects that immediately alert customers and IT to an unusual spike in activity, advantageously enabling the consumers to immediately rectify such issues, without realizing a dramatic fiscal impact to the business.

The present techniques may provide cloud computing sales, management, reporting, governance, and optimization; all in one platform. The present techniques may provide the ability to procure cloud licensure/subscriptions and to have multi-cloud financial snapshots, including unified cloud invoicing, budgeting, cost anomaly detection, and ongoing helpdesk support.

Exemplary Computing Environments

FIG. 1A depicts an exemplary computing environment 100, in which the techniques disclosed herein may be implemented, according to some aspects. The environment 100 includes a client computing device 102, a cloud maturity system 104, and a network 106. Some embodiments may include a plurality of client computing devices 102 and/or a plurality of systems 104. The computing environment 100 includes a cloud environment ENV1 and a multi-brand IT provider environment ENV2. The ENV1 may correspond to one or more public clouds, one or more private clouds and/or one or more hybrid clouds. For example, ENV1 may include a cloud 1, a cloud 2, etc. through a cloud n wherein n is a positive integer. For example, cloud 1 may be an AWS cloud, while cloud 2 is a GCP cloud, while cloud 3 is a Microsoft Azure cloud, and so on. Each of the clouds in the ENV1 may be accessible via the electronic network 106.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). One or more of the client computing devices 102 may be located in the ENV1.

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the cloud maturity system 104, and/or between multiple client computing devices 102, and/or between the cloud maturity system 104 and the clouds in the ENV 1, for example. As shown, the network 106 may include one or more overlapping or separate cloud computing networks, such as one or more public clouds, one or more private clouds and/or one or more hybrid clouds.

The client computing device 102 may include a processor and a network interface controller (NIC). The processor may include any suitable number of processors and/or processor types, such as CPUs and one or more graphics processing units (GPUs). The processor is configured to execute software instructions stored in a memory. The memory may include one or more persistent memories (e.g., a hard drive/solid state memory) and stores one or more set of computer executable instructions/modules. In general, a proprietor (e.g., developer) or customer user may access the cloud computing environments via the network 106 via the client 102.

The cloud maturity system 104 includes a processor 110, a memory 112, an I/O controller 114 and a NIC 116. The cloud maturity system 104 may access the database 108 via the networks/cloud environments 106. The database 108 may be a structured query language (SQL) database (e.g., a MySQL database, an Oracle database, etc.) or another type of database (e.g., a not only SQL (NoSQL) database). The cloud maturity system 104 may include a library of client bindings for accessing the database 508. The database 108 may be separate from any databases initialized as part of a cloud computing environment, whether or not on behalf of customer.

The processor 110 may include any suitable number of processors and/or processor types, such as CPUs and one or more graphics processing units (GPUs). The processor 110 is configured to execute software instructions stored in a memory 112. The memory 112 may include one or more persistent memories (e.g., a hard drive/solid state memory) and stores one or more set of computer executable instructions/modules, including a hyperscaler module 130, a data normalization module 132, a machine learning training module 134, a recommendation engine module 136, a score generation module 138 and a peer ranking module 140. Each of the modules may implement specific functionality related to the present techniques.

The hyperscaler module 130 may include sets of computer executable instructions for collecting data from one or more cloud environments (e.g., the clouds 1-n of ENV 1 in FIG. 1A).

Specifically, the hyperscaler module 130 may include a plurality of sets of executable instructions, wherein each is used to access an individual hyperscaler. For example, a first library of software routines, or bindings, may include a set of instructions for accessing information from an AWS cloud instance, while a second set of instructions for accessing a GCP cloud instance, and a third set of instructions for accessing an Azure cloud instance, and so on. It should be appreciated that the set of software libraries in the hyperscaler module 130 may be extended to support any cloud computing platforms or services. Herein, the data collected by the hyperscaler module 130 may be known as "cloud computing environment operation data."

The sets of computer-executable instructions in the hyperscaler module 130 may include instructions for accessing information about the respective clouds in the cloud environment ENV1 programmatically. For example, the instructions may include instructions for enumerating and querying for statistical information pertaining to the number of cloud instances (e.g., virtual machines, databases, storage blocks, data volumes, IP addresses, etc.) in the cloud(s) of ENV1. The instructions may include instructions for determining usage metrics (e.g., CPU cycles consumed, memory/storage used, database usage, network transfer, API calls, etc.). The hyperscaler module 130 may store this statistical information in the database 108 and/or in the memory 112.

In some aspects, the hyperscaler module 130 may include computer-executable instructions (e.g., an application) that may be packaged and delivered to one or more of the clouds in the environment ENV1. For example, the application may include instructions for forking a daemon process that collects analytics from the respective clouds of the ENV1 and transmits the analytics to the cloud maturity system 104. The analytics may include statistics regarding any use of the respective clouds, such as network bandwidth usage, CPU load, data types, industry affiliations, etc. The application may process information to detect certain keywords, regular expression matches, etc. In some aspects, the application may include a machine learning model trained by the machine learning training module 134 that is specifically trained to detect patterns regarding certain types of information (e.g., information subject to HIPAA protection).

The normalization module 132 may include computer-executable instructions for processing the statistics received by the hyperscaler module 130 to normalize the statistics from different cloud providers, so that the statistics can be directly compared. For example, cloud 1 in the ENV1 may provide outbound data transfer rates in gibibytes per second (GB/s). Cloud 2 in the ENV1 may provide outbound data transfer rates in Gibibytes per second (GiB/s). The normalization module 132 may convert the latter to gigabytes/second so that the two values can be compared. The normalized data may be stored in the database 108 instead of, or along with, the unnormalized data. Other value conversions may be performed as well; for example, different cloud APIs may report information in different ways (e.g., using XML, JSON, or other markup/formatting languages). The normalization module 132 may include instructions for extracting/parsing values from formatted strings. For example, the TLS version of a web server may be reported in JSON in by one cloud provider, and in XML by another cloud provider. Or in JSON string in both instances, but in a flat data structure in the first instance, and in a nested data structure in the second instance; or in two different nested data structures. The normalization module 132 may include instructions for handling such differences to enable the creation of comparable data values. In this way, the normalization module 132 serves to improve information logging in a multi-cloud environment, by making logging of values from multi-cloud environments consistent.

The machine learning training module 134 may include instructions for training one or more machine learning models. For example, the machine learning training module 134 may train one or more machine learning models to determine respective weights (also known as "priority scores") for one or more recommendations. For example, a machine learning model may be trained (e.g., using historical data) to process a set of recommendations and to predict, for each recommendation, a respective weight or priority score, as discussed in further detail with respect to FIG. 5O. A subsequent processing step may use the respective weights/priority scores to compute one or more overall maturity scores, and/or to rank the recommendations based on the respective scores.

In some aspects, the machine learning training module 134 may train one or more generative pre-trained transformer (GPT) models. For example, the machine learning training module 134 may train a GPT model to receive and process data stored in the database 108, such as cloud computing data from one or more hyperscaler instances and/or status information corresponding to the hyperscalers determined via additional processing (e.g., using one or more ML models). In some aspects, the machine learning training model 134 may fine-tune an existing GPT model. The existing model may be, for example, an open source large language model (LLM) (e.g., Large Language Model Meta AI (LLaMA)) or another small-parameter or large-parameter LLM. The fine-tuning may include grounding a pre-trained model by providing additional training examples using a zero-shot or few-shot learning strategy.

Differing sets of training examples may be used to fine-tune one or more GPTs/LLMs in different ways. For example, cloud computing data may be stratified by industry, as discussed herein. Data for one industry (e.g., healthcare) may be selected and used to fine tune an LLM. This fine-tuned model may be called via an API and provided with information about a new customer. For example, the model could be parameterized using information about a newly onboarded customer in the healthcare industry. The model could be queried in a chat mode to ask questions about how the newly onboarded customer's cloud computing usage compares to that of existing healthcare customers. Additional criteria may be used to narrow the customer pool (e.g., healthcare entities with 400 beds or more). Other types of questions that could be answered, for example, relate to which services other comparable companies are using that the newly onboarded customer is not using.

As discussed, the present techniques are anticipated to support a large number of cloud environments (e.g., the cloud environment ENV1) having a large number of potentially heterogeneous clouds. Access to a large volume of data for many customers, across many industries, advantageously enables the present techniques to make comparisons between customer computing environments in those industries.

In some aspects, access to a GPT-based chat tool may be provided to customers, to enable the customers to chat regarding their cloud environments. For example, the customers may query for specifics regarding their cloud environment (e.g., number of instances, utilization rates, etc.). The customers may also request and receive information related to the rule group 502-A. For example, the customer may request information related to security recommendations, as depicted in FIG. 5I. The GPT model may respond by displaying one or more recommendations that the user may perform in order to improve the user's cloud maturity score. The recommendations may be ranked and prioritized as discussed herein.

Figure 4A:
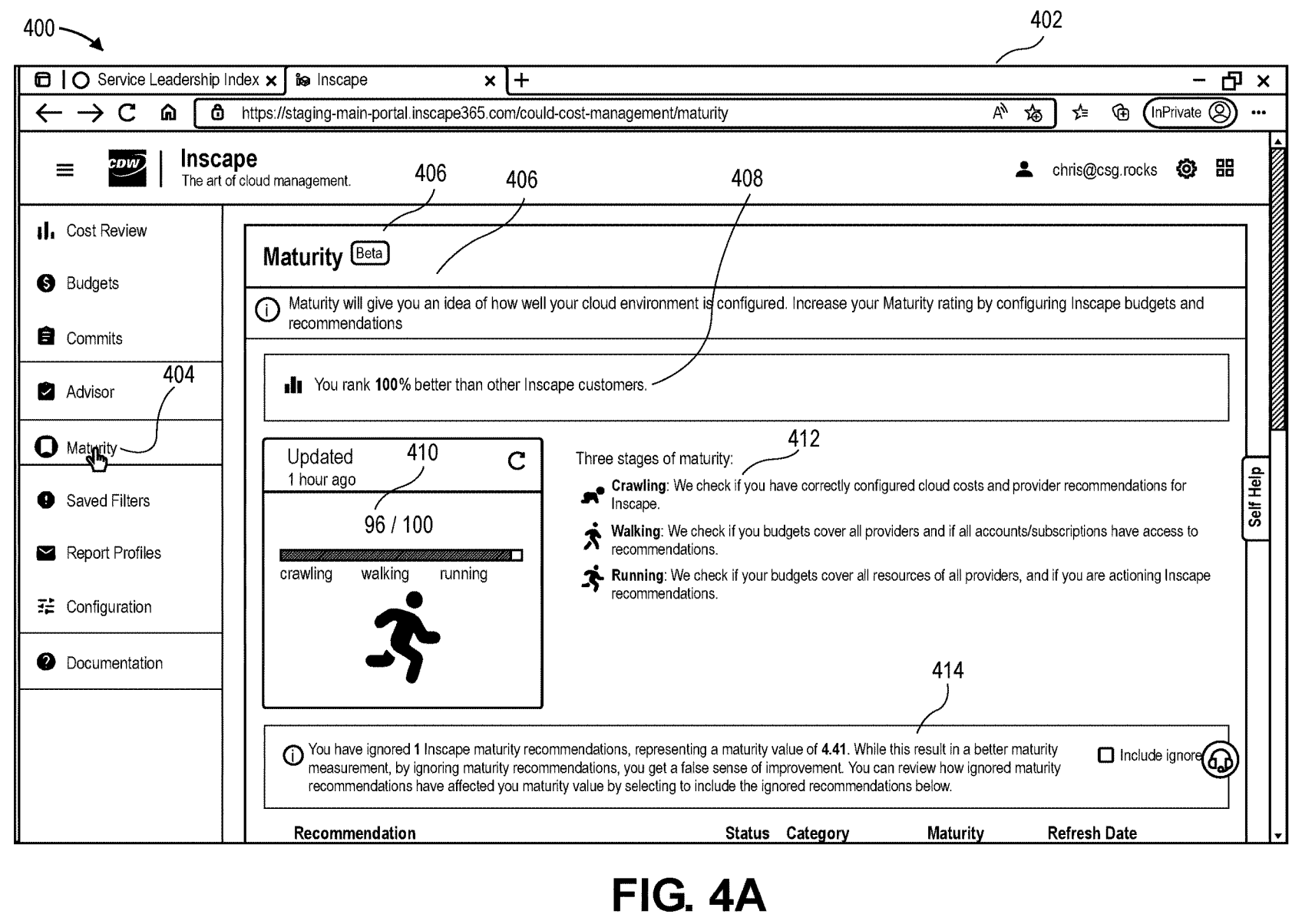
Figure 4B:
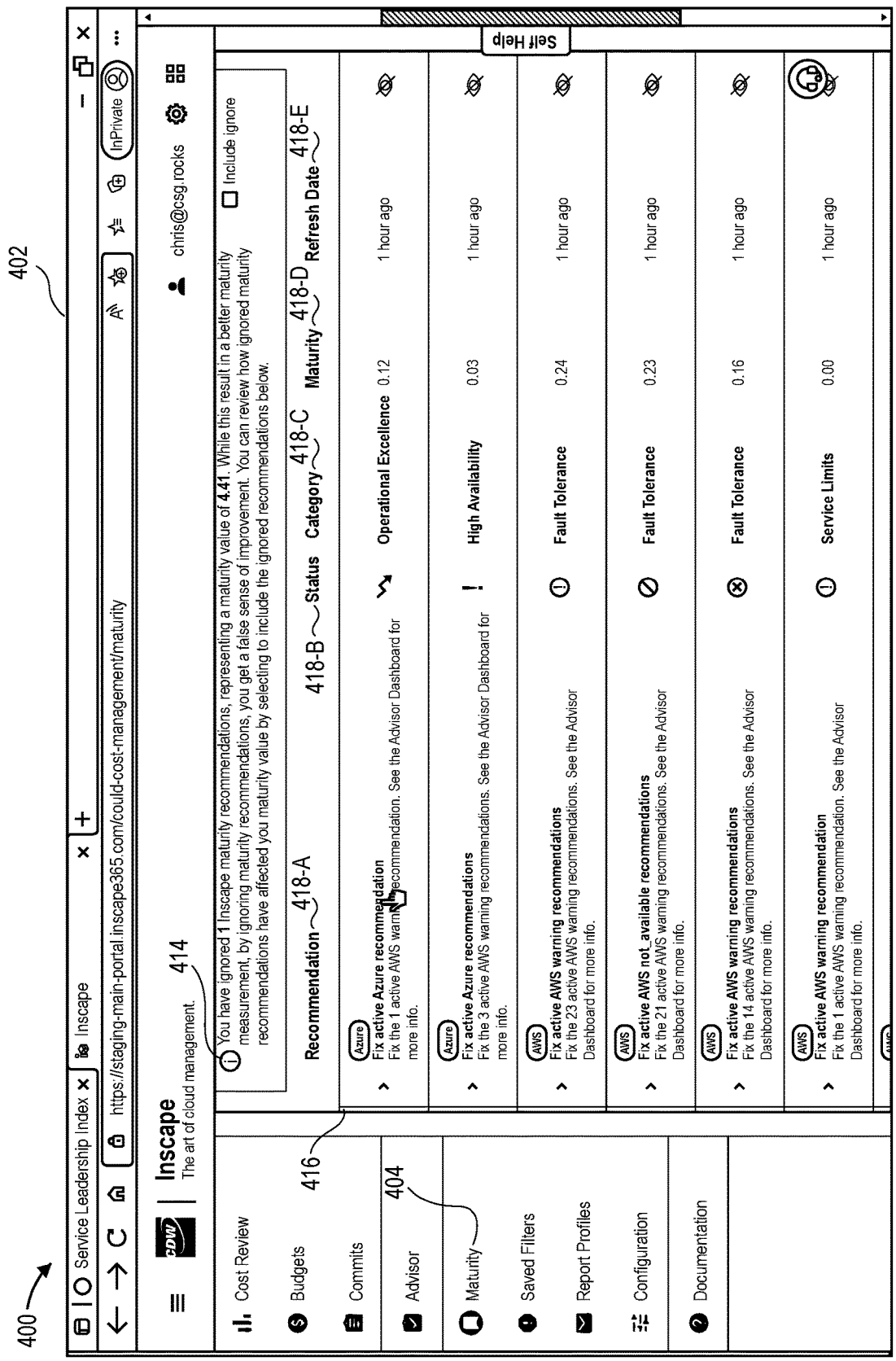
FIG. 4B depicts a cloud management platform including a cloud environment maturity graphical user interface including exemplary recommendations for improving cloud maturity scores, according to some aspects.

The recommendation engine 136 may include a set of computer-executable instructions for generating recommendations to improve cloud infrastructure of the user (e.g., the cloud environment ENV1). FIGS. 4A-4C depict examples of a cloud maturity score corresponding to the cloud computing infrastructure of the user, and FIGS. 5A-5N depict examples of recommendations that may be output by the recommendation engine 136. Each of the recommendations in FIG. 5A may include one or more respective values (e.g., an acceptable range), a Boolean flag, etc.

The recommendation engine 136 may generate the recommendations to improve cloud infrastructure of the user by accessing one or more trained machine learning model trained by the machine learning training module 134. Specifically, the recommendation engine 136 may generate a data structure including recommendations.

The recommendation engine 136 may include analyzing the cloud computing usage of the company/client to determine one or more patterns. In some cases, one or more machine learning models may be used to determine such patterns. For example, a trends module (not depicted) may determine that the company keeps 50% (or less) of cloud computing CPU utilization across a plurality of instances and/or across cloud compute providers. In that case, the recommendation engine may infer that the low utilization is intentional, and may adjust the set of weights corresponding to that customer/client, to customize the recommendations given to that client. In this case, the client would not receive a recommendation to downsize their instances, due to the desire of the client to maintain headspace in the cloud computing CPU, based on the pattern matching.

The score generation module 138 may include computer-executable instructions for generating scores, including a cloud maturity score. The cloud maturity score may be computed by evaluating a function that considers certain criteria/factors (e.g., the industry of the customer), and a plurality of weighted recommendations describing the customer's cloud environment. Score generation and the cloud maturity score are discussed further below. As discussed, the recommendation engine 136 may generate recommendations for performing actions to change individual scores based on rules that have respective weights. Once the customer's cloud computing instance(s) is scored individually using the plurality of rules, the score generation module may generate one or more maturity scores. A global maturity score may be generated that considers both the status of the user's environment, and weights established for one or more properties of the user's environment. The score generation module 138 may generate one or more scores based on the customer's environment type (e.g., development, production, test); based on the type of instances that the customer is using (e.g., by cloud provider); according to different projects/profiles established by the customer, as described herein, etc.

In some aspects, the score generation module 138 may apply a multiplier to weights based on a detected industry of the customer. For example, when the industry is healthcare, the score generation module may multiply recommendations related to protection of personally-identifiable information (PII) by a factor to account for the importance of protecting such information in the healthcare space. Many other industry-based and/or data based recommendations are envisioned. For example, in some aspects, a graphical user interface may enable the customer to select a resource utilization profile that corresponds to the customer's desired optimization criteria. For example, in some aspects, the customer may desire to optimize for low cost, in others, the customer may seek to preserve sufficient headroom in CPU, memory and other cloud computing resources to enable scaling, etc.

The peer ranking module 140 may include computer-executable instructions for collecting data based on activities of the clouds in the could environment ENV1. For example, the peer ranking module 140 may receive information from the hyperscaler module 130 and process the information to determine the purposes for which the cloud environment ENV1 is being used. In some aspects, the hyperscaler module 130 may receive information from an application executing in the cloud 1 (e.g., the daemon process discussed above). The peer ranking module 140 may include instructions for storing the received data and for processing the data to create comparable data. For example, the comparable data may include indications of industry affiliation (e.g., healthcare) analytics regarding the cloud environments. The industry may correspond to a client of the IT provider. In this way, the IT provider can learn the purpose for which the client is using one or more cloud(s) in the ENV1, and compare that usage across clients. This comparison may enable the IT provider to rank the usage of the different clients, and to provide maturity scores as discussed herein. Further, this comparison advantageously enables the IT provider to provide maturity scores that are customized to specific cloud resource use cases and/or environments, in contrast to systems that do not make such distinctions. Empirical testing has shown that this comparison data is powerful in helping the IT provider to improve customer rankings by recommending more efficient usage of cloud resources, for example, in a cloud consulting use case. Further, the more customers/clients that are added to the ENV1, the more insightful the comparison data becomes.

The input output controller 114 may include instructions for processing inputs from an input device 150 and for generating outputs for an output device 152. The input device 150 and the output device 152, respectively, enable input to be received from a user for example from a keyboard or mouse or other input device, and for outputs that correspond to be generated and transmitted to the output device. In some cases, the input device 150 and the output device 152 may be combined into a single device such as a capacitive touch screen.

Figure 1B:
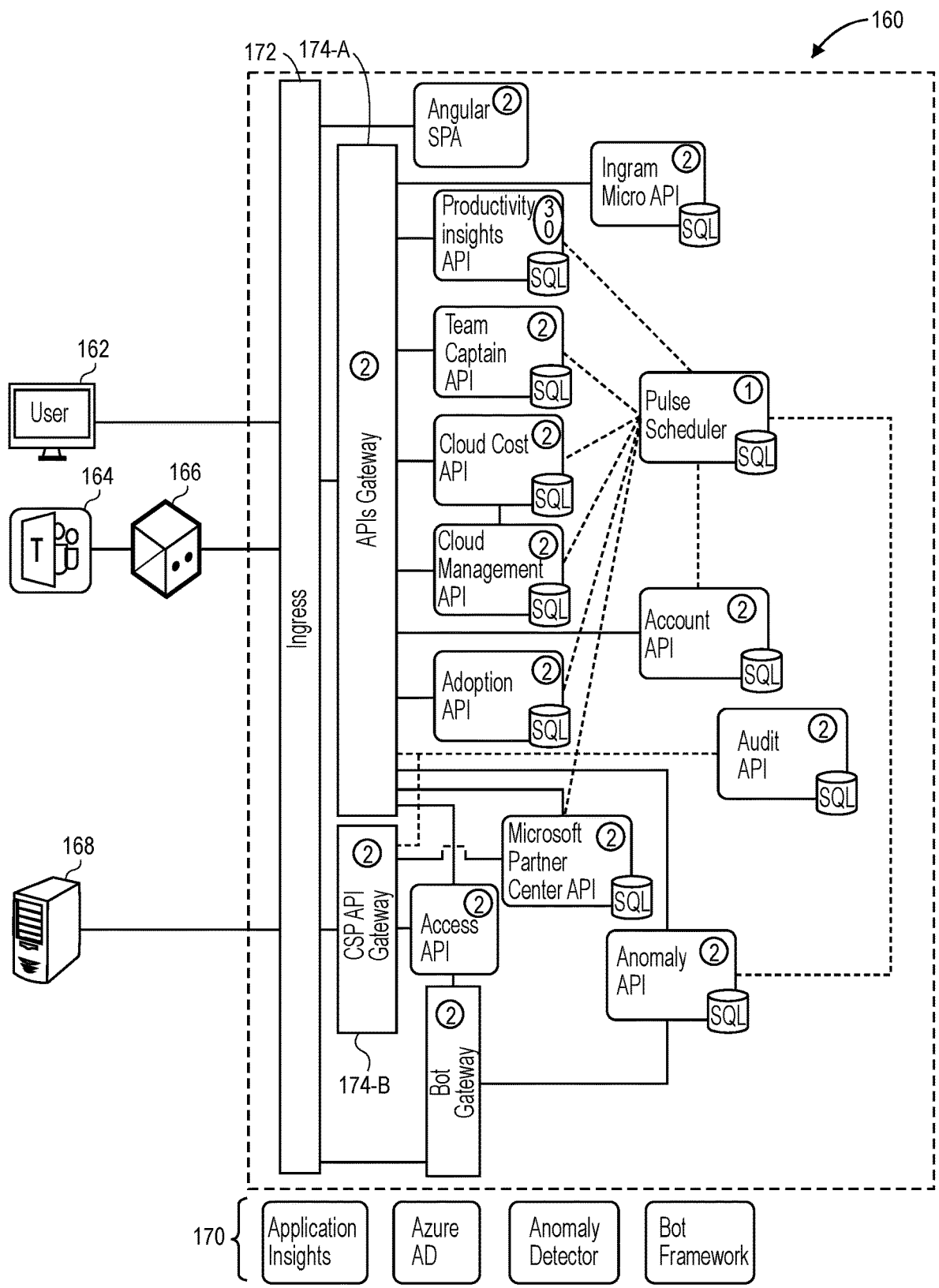
FIG. 1B depicts an exemplary computing environment for providing cloud maturity scores for improving cloud computing health to end users, according to some aspects.

FIG. 1B depicts an exemplary computing environment 160 for providing cloud maturity scores for improving cloud computing health to end users, according to some aspects. In some aspects, the environment 160 may correspond to the environment 100 of FIG. 1A. End users may access the environment 100 by multiple ingress routes. For example, the environment 160 may be accessible by a user device 162 (e.g., via an electronic network such as the network 106 of FIG. 1A). For example, the user device 162 may correspond to the user device 102 of FIG. 1A. The environment 160 may include one or more client applications 164 and one or more application proxies 166 (e.g., a SIP proxy). The computing environment 160 may include one or more external services 168, and one or more microservices, including docker containers, a Kubernetes management platform. Specific example services that may be used to implement the environment 160 in some aspects include Docker containers, Azure Kubernetes (AKS), SQL DB, Cosmos DB, Azure Service Bus, Azure Key Vault and Azure Storage.

The user devices, applications 164, application proxies 166 and external services 168, and microservices 170 may access the environment 160 via an ingress controller 172 (e.g., an NGINX controller). The ingress controller 172 may leverage Kubernetes, for example, to provide a scalable, manageable, and robust SaaS application that can be used as the hub for future "snap in" departmental development needs.

The ingress controller 172 may proxy access from external sources via one or more API gateways 174 (e.g., Ocelot API gateways). The ingress controller 172 and API gateways 174 may proxy access to internal APIs and/or SPAs. The environment 160 may include a billing engine that allows for proration of cloud/SaaS costs with the ability to bundle professional and managed services that can be invoiced on a monthly, quarterly, or annual basis. The billing engine may generate unified cloud invoices for customers and, on a monthly basis ingest billing information (e.g., CSV file into its accounting system).

The computing environment 160 of FIG. 1B may be a multi-tenant, Service Organization Control (SOC) II/Type II Certified Platform that provides unified single sign on, role-based access control, and multi-factor authentication with open REST APIs.

Exemplary Computer-Implemented Machine
Learning Model Training and Model Operation In general, a computer program or computer based product, application, or code (e.g., the model(s), such as machine learning models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 110 (e.g., working in connection with the respective operating system in memory 154) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

For example, in some aspects, the ML model training module 134 may include a set of computer-executable instructions implementing machine learning training, configuration, parameterization and/or storage functionality. The ML model training module 134 may initialize, train and/or store one or more ML models, as discussed herein. The trained ML models may be stored in the database 108, which is accessible or otherwise communicatively coupled to the cloud maturity system 104. The modules 120 may store machine readable instructions, including one or more application(s), one or more software component(s), and/or one or more APIs, which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The ML training module 134 may train one or more ML models (e.g., an artificial neural network (ANN)). One or more training data sets may be used for model training in the present techniques, as discussed herein. The input data may have a particular shape that may affect the ANN network architecture. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an aspect, the ANN may use different activation functions at each layer, or as between hidden layers and the output layer. A suitable optimizer may include Adam and Nadam optimizers. In an aspect, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some aspects, training may be performed by successive evaluation (e.g., looping) of the network, using training labeled training samples. Over time, the cloud maturity system may receive data from cloud environments that are responding to changes in environmental conditions, which may cause the predictions of the machine learning models described herein to before more accurate in response to those environmental conditions over time.

The process of training the ANN may cause weights, or parameters, of the ANN to be created. The weights may be initialized to random values. The weights may be adjusted as the network is successively trained, e.g., using one or more gradient descent algorithms, to reduce loss and to cause the values output by the network to converge to expected, or "learned", values. In an aspect, a regression may be used which has no activation function. Therein, input data may be normalized by mean centering, and a mean squared error loss function may be used, in addition to mean absolute error, to determine the appropriate loss as well as to quantify the accuracy of the outputs. In some aspects, the present techniques may include one or more ML models that perform a regression analysis.

In various aspects, an ML model, as described herein, may be trained using a supervised or unsupervised machine learning program or algorithm. The machine learning program or algorithm may employ a neural network, which may be a convolutional neural network, a deep learning neural network, and/or a combined learning module or program that learns in two or more features or feature datasets (e.g., structured data, unstructured data, etc.) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be based on, or otherwise incorporate aspects of one or more machine learning algorithms included as a library or package executed on cloud maturity system 104. For example, libraries may include the TensorFlow based library, the Pytorch library, and/or the scikit-learn Python library.

Machine learning may involve identifying and recognizing patterns in existing data (such as data risk issues, data quality issues, data sensitivity, resource usage, industry affiliation, data type, etc.) in order to facilitate making predictions, classifications, and/or identifications for subsequent data. Machine learning model(s), may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

For example, the ML training module 134 may analyze labeled historical data at an input layer of a model having a networked layer architecture (e.g., an artificial neural network, a convolutional neural network, a deep neural network, etc.) to generate ML models. The training data may be, for example, data collected from hyperscalers of one or more customers (e.g., those in similar industries). The historical data may include labels. During training, the labeled data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. One or more ML models may be trained to predict weights for addressing issues related to cloud computing instances. The ML training module 134 may include training a respective output layer of the one or more machine learning models. The output layer may be trained to output a prediction, for example, or to output a number (e.g., a weight). In some aspects, multiple ANNs may be separately trained and/or operated. In some aspects, the present techniques may include using a machine learning framework (e.g., Keras, scikit-learn, etc.) to facilitate the training and/or operation of machine learning models.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. In the present techniques, unsupervised learning may be used, inter alia, for natural language processing purposes and to identify scored features that can be grouped to make unsupervised decisions (e.g., numerical k-means). Supervised learning and/or unsupervised machine learning may also comprise retraining, relearning, or otherwise updating models with new, or different, information, which may include information received, ingested, generated, or otherwise used over time. The present techniques may use one or both of such supervised or unsupervised machine learning techniques. In various aspects, training the ML models herein may include generating an ensemble model comprising multiple models or sub-models, comprising models trained by the same and/or different AI algorithms, as described herein, and that are configured to operate together.

Once the model training module 134 has initialized the one or more ML models, which may be ANNs or regression networks, for example, the model training module 134 trains the ML models by inputting labeled data into the models.

The model training module 134 may divide the labeled data into a respective training data set and testing data set. The model training module 134 may train the ANN using the labeled data. The model training module 134 may compute accuracy/error metrics (e.g., cross entropy) using test data and test corresponding sets of labels. The model training module 134 may serialize the trained model and store the trained model in a database (e.g., the database 108). The model training module 134 may train and store more than one model. For example, the model training module 134 may train an individual model for each customer type, cloud instance type, industry type, etc. It should be appreciated that the structure of the network as described may differ, depending on the aspect.

In some aspects, the computing modules 120 may include a machine learning operation module (not depicted), comprising a set of computer-executable instructions implementing machine learning loading, configuration, initialization and/or operation functionality. The ML operation module may include instructions for storing trained models (e.g., in the electronic database 108, as a pickled binary, etc.). Once trained, a trained ML model may be operated in inference mode, whereupon when provided with de novo input that the model has not previously been provided, the model may output one or more predictions, classifications, etc. as described herein. In an unsupervised learning aspect, a loss minimization function may be used, for example, to teach a ML model to generate output that resembles known output (i.e., ground truth exemplars).

Once the model(s) are trained by the model training module 134, the model operation module may load one or more trained models (e.g., from the database 108). The model operation module may apply new data that the trained model has not previously analyzed to the trained model. For example, the model operation module may load a serialized model, deserialize the model, and load the model into memory. The model operation module may load new cloud data that was not used to train the trained model. The model operation module may apply the one or more input tensor(s) to the trained ML model. The model operation module may receive output (e.g., tensors, feature maps, etc.) from the trained ML model. The output of the ML model may be a prediction of a weight for addressing a cloud status/action. In this way, the present techniques advantageously provide a means for the company to quantitatively determine the impact to cloud maturity of addressing certain problems, and to triage a cloud environment, without resorting to "best guesses" or other subjective metrics used in conventional industry practices.

The model operation module may be accessed by another element of the cloud maturity system 104 (e.g., a web service). For example, the ML operation module may pass its output to the recommendation engine 136 for further processing/analysis.

In some aspects, the modules 120 may include more or fewer modules. For example, in some aspects, the modules 120 may include instructions for performing a migration once a suitable migration plan has been identified.

In operation, a user (e.g., a cloud engineer, cloud technician, IT/cloud computing administrator, etc.) accesses the cloud maturity system 104, for example, from the client 102. The client 102 may be a laptop, a desktop, a mobile device, etc. of the user. In some aspects, the user may access the cloud maturity system 104 via the input device 150 (i.e., by directly accessing the cloud maturity system 104). The cloud administrator may be seeking to analyze data collected from one or more hyperscalers such as the hyperscalers operating cloud 1-cloud n of ENV1.

In some aspects, the client 102 provides access to a customer of the cloud maturity system 104. The client 102 may enable the user to access a cloud maturity score generated by the score generation module 138. As discussed, the hyperscaler module 130 may run periodically or continuously, collecting information and storing it in the database 108. The normalization module 132 may process the information collected by the hyperscaler collection module 130 such that the data can be compared in an apples-to-apples manner across cloud providers, which is an advantage of the present techniques, as discussed herein.

The recommendation engine 136 may process the collected information and determine the status of one or more actions or states with respect to the individual hyperscalers, as discussed in further detail below. The score generation module 138 may generate one or more cloud maturity scores as discussed herein for example by evaluating whether each of the recommendations generated by the recommendation engine 136 have been addressed or not in the user's respective cloud computing environment(s). Different scores may be generated for different subsets of the user's environment.

The peer ranking module 140 may compare these score or scores of the user to those of all other users or some other users. The cloud maturity scores and peer rankings may be depicted and displayed on graphical user interfaces that are provided to the user for example via the client 102. One or more machine learning models trained by the machine learning training module 134 may update weights used to compute the user's cloud maturity score(s).

Figure 2:
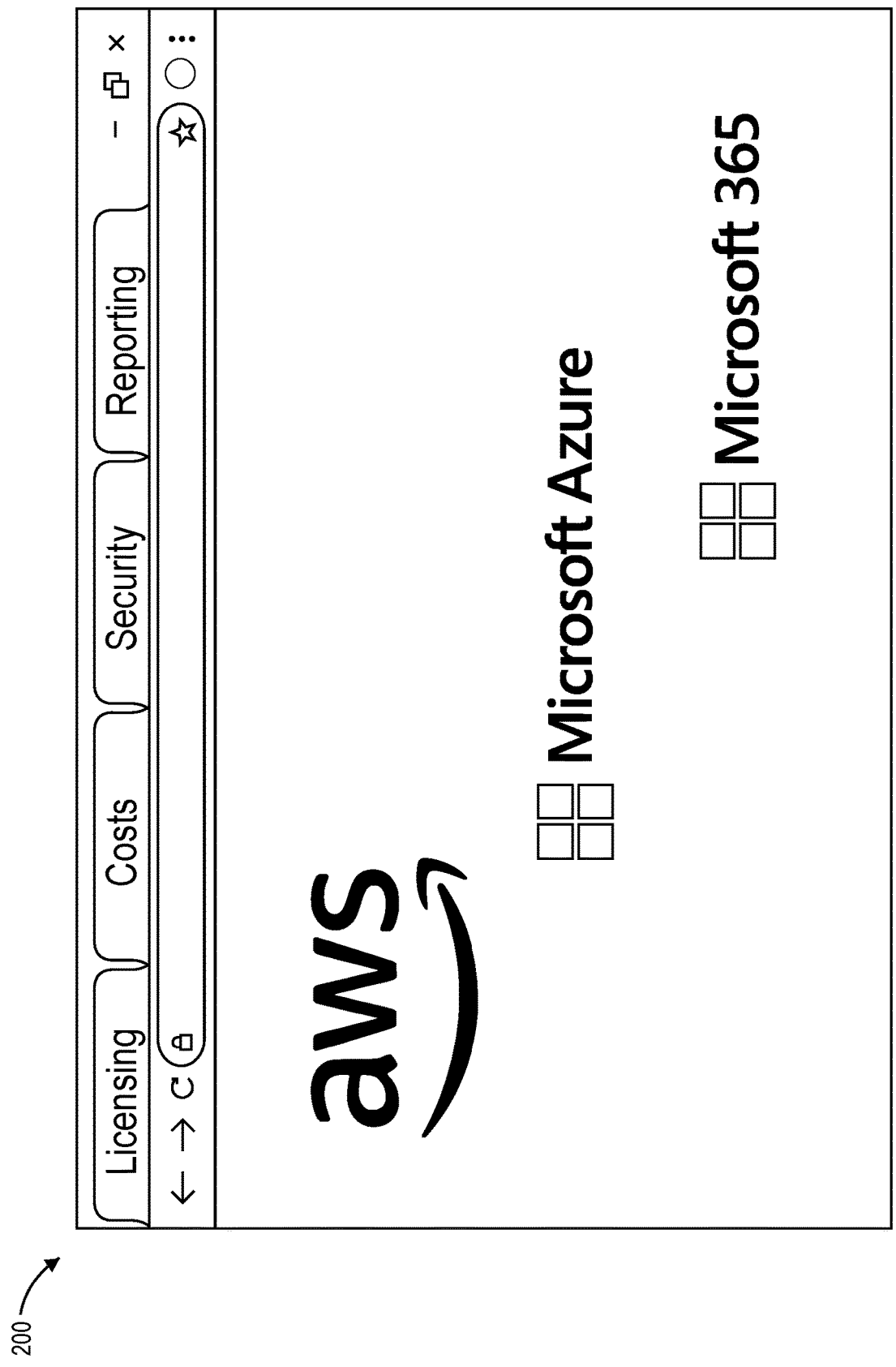
FIG. 2 depicts exemplary cloud computing environments accessible by the computing environment of FIG. 1A and the computing environment of FIG. 1B, according to some aspects.

FIG. 2 depicts exemplary cloud computing environments accessible by the computing environment of FIG. 1A and the computing environment of FIG. 1B, according to some aspects. FIG. 3 depicts a block diagram of functionality provided by the exemplary cloud computing environment of FIG. 1A and/or FIG. 1B, according to some aspects.

Exemplary Cloud Maturity Score Graphical User Interfaces

FIG. 4A depicts a cloud management platform including a cloud environment maturity graphical user interface 400. The cloud environment maturity graphical user interface 400 may include a cloud environment maturity window 402 and a cloud environment maturity tab 404.

When the user accesses the cloud environment maturity tab 404, the cloud environment maturity graphical user interface 400 may display a maturity score window 406.

The maturity score window 406 may include a peer comparison region 408, a numerical cloud maturity score 410 and a categorical cloud maturity score 412, according to some aspects.

The numerical cloud maturity score 410 and/or the categorical cloud maturity score 412 may include respective "crawl-walk-run" maturity stage indicators, as shown, which may include textual and/or graphical labels/indicators. The crawl-walk-run model is helpful to users, and is integrated with the overall invention.

As an example, a user may set up one or more profiles. The present techniques will then rank the customer's maturity level based on implementing the recommendations that the recommendation engine module 136 is providing. For instance, if the recommendation engine module 136 gives the customer 10 recommendations on how to reduce cloud spend but the customer implements up to 50% of them, they will receive a crawl maturity status. For 75% implemented, the customer will receive a walk status, and 90% completed would result in a run status. In aspects, the present techniques may use other measures to assign crawl-walk-run scores. For example, if a customer has 10 cloud accounts, cloud subscriptions and/or projects but less than 50% of them are associated with a profile, they will receive a Crawl Maturity level. When they get to 75% of them assigned to a profile, they will receive a Walk maturity level. Upon 90% included in the profile, they will receive a run maturity status. Moreover, the present techniques may determine the maturity Level of staying within budget.

Continuing the example, of the 10 profiles, if 50% are over their budgets they will be at crawl level, if 25% are over budget they will be at walk, and if less than 10% are over budget they will be at run level. The score generation module 138 may include a plurality of tables that score the foregoing percentage thresholds with respect to different cloud accounts and profiles. In some aspects, different accounts may be assigned different percentages. For example, a given customer may be considered to be at a walk stage at 10% over budget for GCP, but at a crawl stage at 10% over Azure, due to external factors (e.g., price differences). The threshold percentages may be assigned for any cloud properties, as discussed in the next section. In still further aspects, the user's implementation of recommendations alone may be used to populate the crawl-walk-run indicator, the peer comparison region 408, the numerical cloud maturity score 410 and/or the categorical cloud maturity score 412.

The maturity score window 406 may further include a warning region 414 that includes notifications regarding one or more ignored or unapplied recommendations, along with an option to ignore such recommendations.

FIG. 4B depicts the cloud management platform including the cloud environment maturity graphical user interface 400 of FIG. 4A. FIG. 4B depicts the result of the user having scrolled down in the maturity score window 406, past the warning region 414, which is also depicted in FIG. 4B.

In the example shown, beneath the warning region 414 is depicted a recommendations table 416, wherein each row corresponds to a recommendation generated by the recommendation engine module 136 of FIG. 1A. The recommendations relate to the one or more cloud environments of the logged in user (e.g., chris@csg.rocks, as in the example depicted in FIG. 4B). The recommendations table is composed of several columns, including a recommendation description column 418-A, a recommendation status column 418-B, a recommendation category column 418-C, a maturity score column 418-D, and a timestamp column 418-E.

By viewing the recommendations table 416, the user can get a quick sense of the user's recommendations, across multi-cloud environments. That is, advantageously, the user can view, in the single user interface of FIG. 4B, recommendations in multiple environments provided by different cloud providers (AWS and Azure as in the depicted example) that normally would require the user to login to multiple websites to perform the "swivel chair integration" discussed above. Thus, the graphical user interface 400 represents a significant improvement over conventional cloud management techniques, by specifically improving the cloud computing management user interfaces, by enabling them with multi-provider, one-stop management.

The graphical user interface 400 of FIG. 4A and FIG. 4B enables the user to quickly establish a base line of where the client is today by looking at all of their AWS Accounts, Azure Subscriptions and GCP Projects. The columns of the recommendations table 416 gives the user a high-level of which categories problems are occurring in, the magnitude of those problems (stated differently, how much the user's score can be improved by addressing those problems), the age of those problems, etc.

It should be appreciated that the present techniques may drive service sales. For example, throughout the maturity life cycle, the IT services provider may provide consulting advice on how to improve and move to the next cloud maturity level. This is another example of improving the technology of cloud services delivery, by improving managed services opportunities. Many clients will want to be at the run stage but just do not have time/resources to devote to solving the problems/adopting the recommendations, and will rely on the IT solutions provider to adopt those recommendations on their behalf. To that end, the graphical user interface 400 may include an element (e.g., "adopt all recommendations") that causes the cloud maturity system 104 to automatically update the client's one or more cloud computing environments in the ENV1. In response to receiving such a selection, the cloud maturity system 104 (e.g., the hyperscaler module 130) may cause, via one or more APIs, the cloud environments ENV1 of the user/customer to be modified to adopt the recommendations. In some aspects, the graphical user interface 400 may enable the user to select one or more recommendations, rather than all of the recommendations, and to cause only those selected recommendations to be applied to the cloud environment ENV1.

Exemplary Cloud Recommendation Engine Rules

FIG. 4A depicts a cloud management platform including a cloud environment maturity graphical user interface including exemplary numerical and categorical cloud maturity scores, according to some aspects.

FIG. 4B depicts a cloud management platform including a cloud environment maturity graphical user interface including exemplary recommendations for improving cloud maturity scores, according to some aspects.

FIG. 5A depicts exemplary cloud computing environment best practice rules 500-A (e.g., Microsoft Cost Savings Recommendations), according to some aspects. FIG. 5A includes a rule group 502-A, a plurality of rule categories 502-B (e.g., Compute, MariaDB, MySQL, etc.) each of which includes one or more respective rulesets (e.g., "Use Standard Storage to store Managed Disks snapshots," "Right-size or shutdown underutilized virtual machines,"

etc. The remainder of rule groups and rule categories are not labeled, but the structure of those categories and rulesets should be clear to the reader.

Each of the rulesets may be associated with one or more values (not depicted) that describe optimal values, in some aspects. For example, "Use Standard Storage to store Managed Disks snapshots" may be associated with a status value of True (e.g., in the database 108), such that the recommendation engine module 136 can determine whether the current status of a cloud environment in the ENV1 is an optimal value, or not. The associated values may include Boolean values, integer values, character values and/or values of specific higher order data types (e.g., a string, an object, etc.).

Further, as described with respect to FIG. 5O, each of the rulesets may be associated with values (not depicted) that describe the respective maturity score associated with performing each of the actions referenced in the rulesets. For example, again with reference to FIG. 5A, Right-sizing an underutilized MySQL server may include a False status value, and a maturity score of 0.00026879, as shown in ruleset 520-C of FIG. 5O, wherein the maturity score represents an increment or factor that will be applied to the user's maturity score if/when the user (or the IT services company) adopts the action recommended by the ruleset.

Figure 5E:
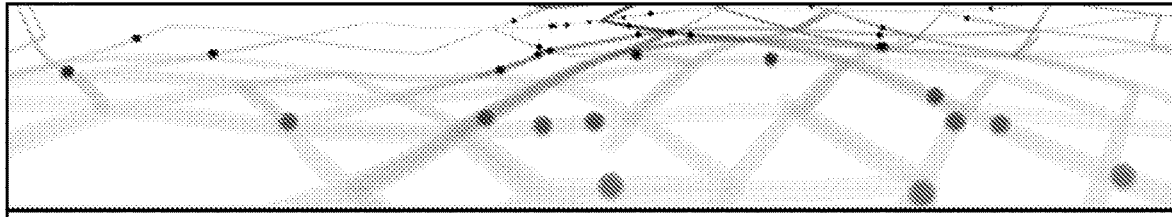
FIG. 5E depicts cloud computing environment best practice rules, according to some aspects.

FIG. 5B depicts additional exemplary cloud computing environment best practice rules 500-B, according to some aspects. FIG. 5C depicts additional exemplary cloud computing environment best practice rules 500-C, according to some aspects. FIG. 5D depicts additional exemplary cloud computing environment best practice rules 500-D, according to some aspects. FIG. 5E depicts additional exemplary cloud computing environment best practice rules 500-E, according to some aspects. FIG. 5F depicts additional exemplary cloud computing environment best practice rules 500-F, according to some aspects. FIG. 5G depicts additional exemplary cloud computing environment best practice rules 500-G, according to some aspects. FIG. 5H depicts additional exemplary cloud computing environment best practice rules 500-H, according to some aspects. FIG. 5I depicts additional exemplary cloud computing environment best practice rules 500-1, according to some aspects. FIG. 5J depicts additional exemplary cloud computing environment best practice rules 500-J, according to some aspects. FIG. 5K depicts additional exemplary cloud computing environment best practice rules 500-K, according to some aspects. FIG. 5L depicts additional exemplary cloud computing environment best practice rules 500-L, according to some aspects. FIG. 5M depicts additional exemplary cloud computing environment best practice rules 500-M, according to some aspects. FIG. 5N depicts additional exemplary cloud computing environment best practice rules 500-N, according to some aspects.

Exemplary Cloud Computing Maturity Rules Engine

FIG. 5O depicts exemplary cloud computing rules 510 including the best practices of FIGS. 5A-5N paired with respective computed weight values in a nested data structure used by a recommendation engine (e.g., the recommendation module 136 of FIG. 1A), according to some aspects. The rules 510 may include one or more static and/or dynamic values associated with one or more actions.

Specifically, the rules 510 are depicted in FIG. 5O as being encoded in a nested dictionary data structure 512 (e.g., a nested hash table). The dictionary 512 has first keys 514 that represent a high level grouping of rule types (e.g., Cost Savings, Operational Excellence, etc.) and first values 516 that include one or more further sub-dictionaries 516 representing rule categories. For example, the values 516-A correspond to the rule group 502-A of FIG. 5A, and the values 518-A through 518-E correspond, respectively, to the rule categories 502-B of FIG. 5A.

Specifically, the dictionaries/lists of rules 516 include second keys 518 describing a ruleset name, each corresponding to second values 520 that include one or more key/value rule pairs, each key-value pair having a respective key 524 representing an action to take (or not take) by the company, and a respective value 526 representing a corresponding weight for taking (or not taking) the action with respect to a cloud computing environment. In some aspects, the weights may be negative numbers, indicating a penalty for taking an action, or zero (representing neutrality of the action). The values 526 may respectively be static values, or in some aspects, determined dynamically.

For example, in some aspects, the values 526 may be determined by a machine learning model that processes historical data to determine the values 526. For example, the IT services company may process historical billing data to determine that enabling an autoscaler in the data explorer of value 520-F has resulted in a proportionally large cost reduction. The machine learning model may be trained to output a large or smaller weight value based on this information. Other data that may be analyzed includes performance logging data. For example, an unsupervised machine learning model may be trained using historical CPU load information, and may determine that configuring manual throughput in CosmosDB at value 520-E results in more stable performance. Thus, the machine learning model may increase the weight value of the corresponding ruleset in value 520-E. Many other such machine learning-based dynamic weighting applications are envisioned.

Advantageously, by using machine learning to determine the weights, human bias can be removed from the process of assigning weights. For example, the values (i.e., weights) may be determined by the one or more machine learning models trained by the machine learning training module 134 of FIG. 1A. In some aspects, the recommendation engine 136 may operate the one or more trained machine learning models, and may output the one or more weights. Once the recommendation engine 136 (or another module) uses a trained machine learning model to generate the weights, the recommendation engine 136 may store the weights in association with the keys 524, within the lists of rules 516, within the rule categories 514.

The dictionary data structure 512 is hierarchical, enabling the rules to be clustered by category (e.g., by cloud computing vendor, type, cloud computing value proposition (e.g., cost savings vs. operational excellence as in the depicted example, etc.). Additional levels of nesting may be added to further categorize/group rules. The hierarchical structure of the dictionary data structure 512 also enables the rules to be filtered (i.e., searched) and sorted/ranked (e.g., by weight).

Example Cloud Access, Integration and Provisioning Graphical User Interfaces

For customers not buying cloud services via the IT solutions provider, it may be necessary for the user to grant permissions to the IT solutions provider to access their various cloud instances, so that the present techniques (e.g., the cloud maturity system 104) can access the statistics and analytics of the user's cloud(s). For customers buying cloud services via the IT solutions provider, the IT solutions provider may already have the data that is needed and may not need to download it.

Figure 6A:
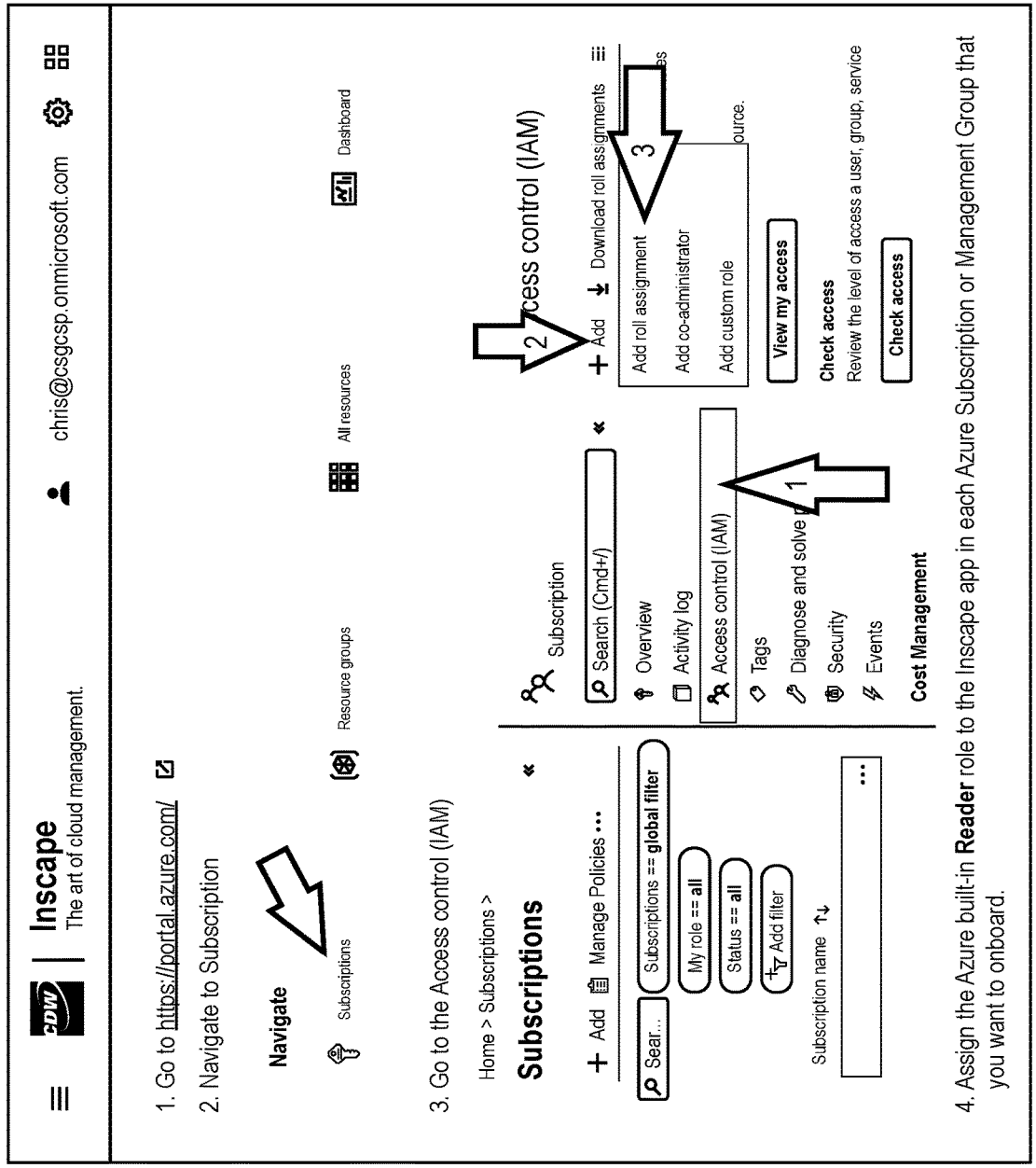
FIG. 6A depicts graphical user interfaces for accessing cloud computing access control resources, according to some aspects.
Figure 6B:
FIG. 6B depicts graphical user interfaces for accessing cloud computing access control resources, according to some aspects.
Figure 6C:
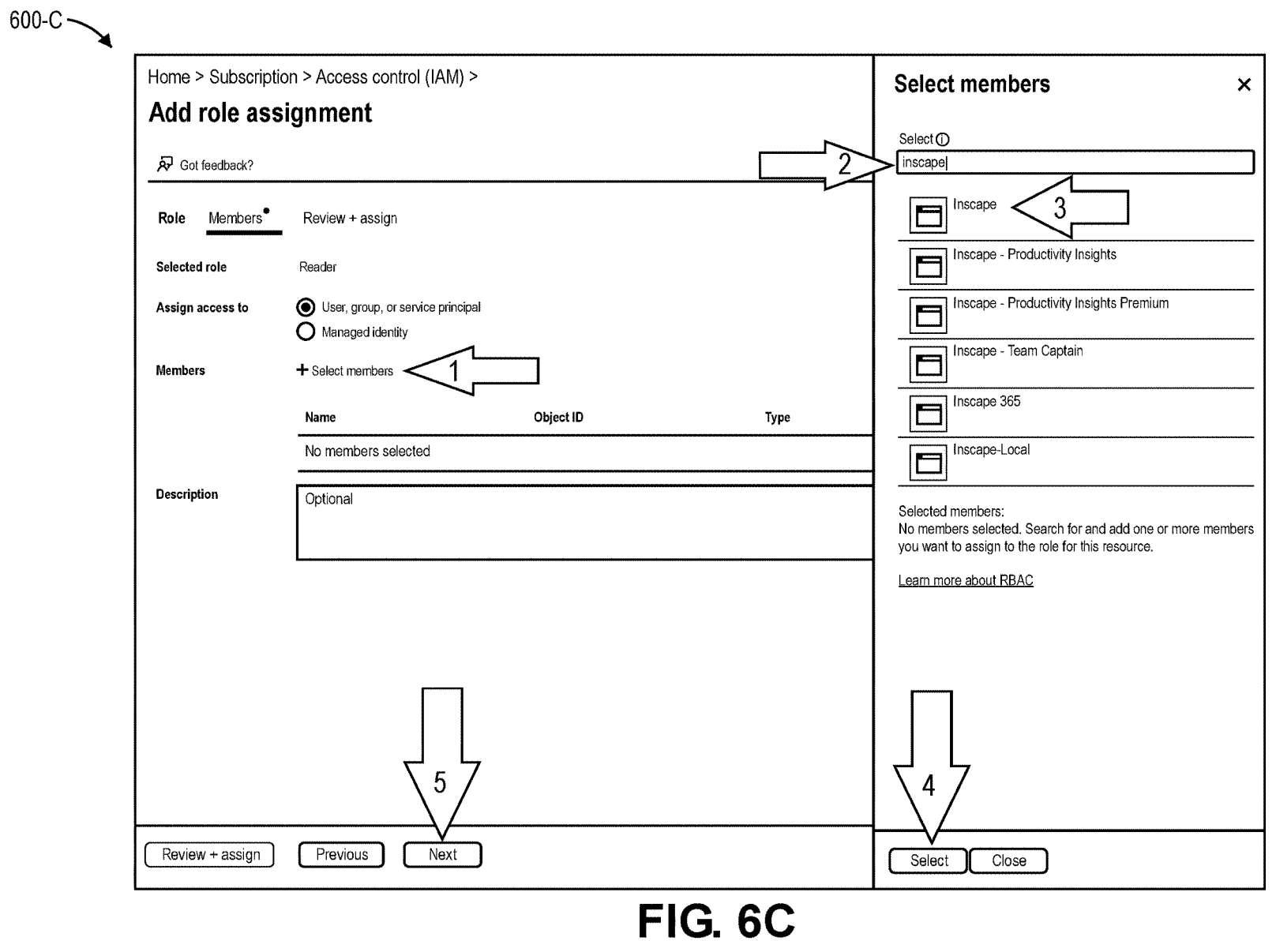
Figure 7A:
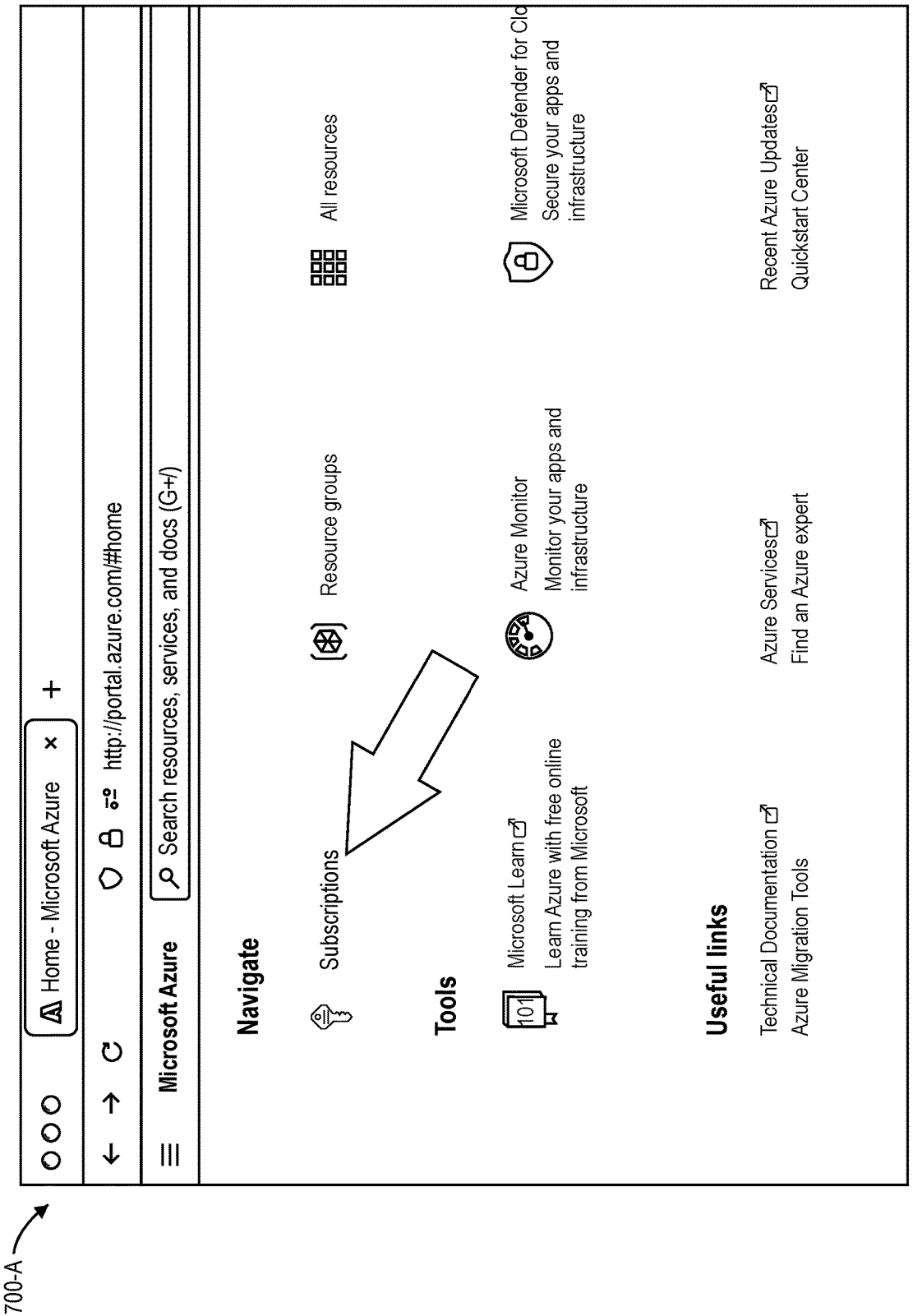
FIG. 7A depicts graphical user interfaces for accessing cloud computing subscription resources, according to some aspects.
Figure 7B:
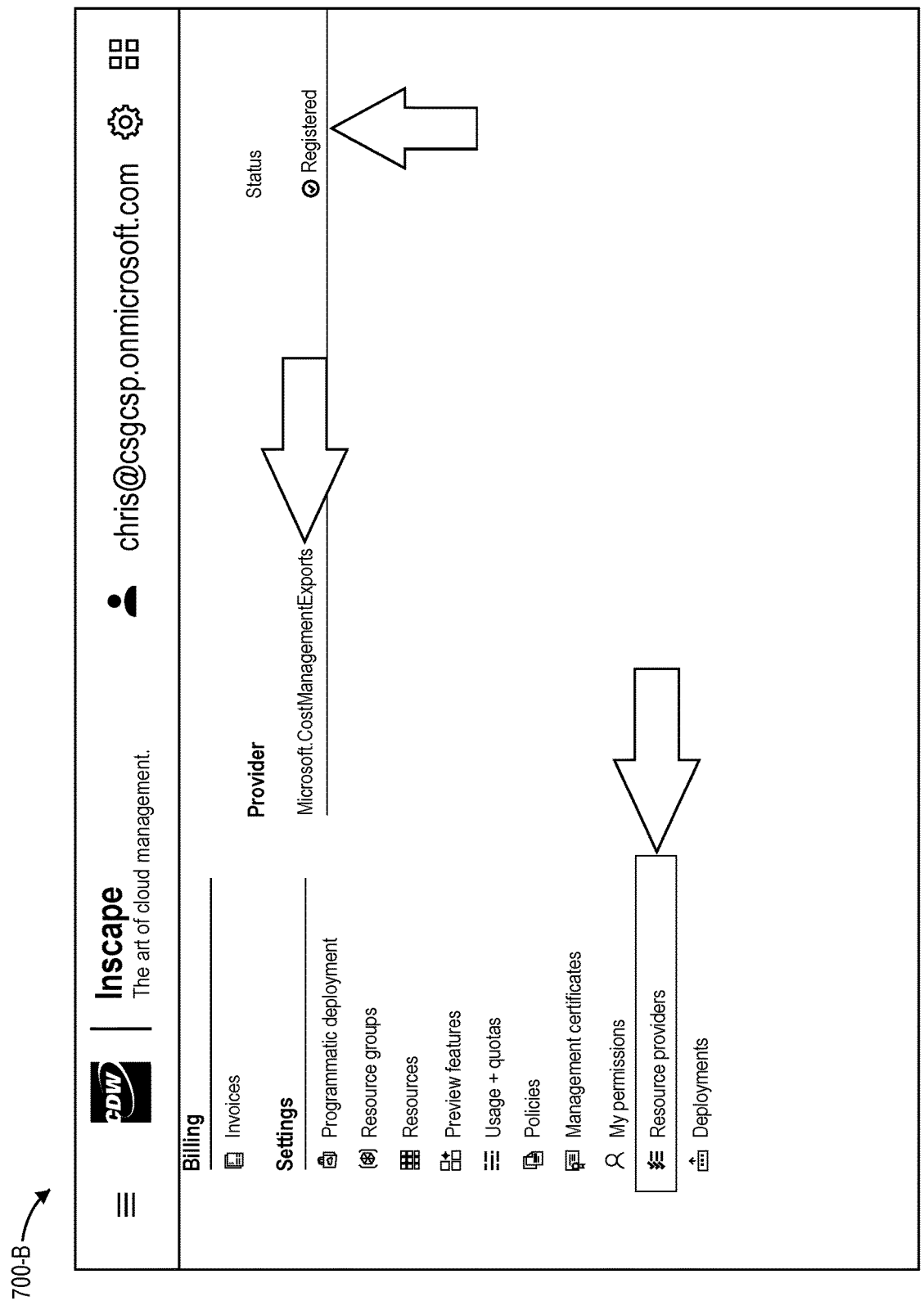
FIG. 7B depicts graphical user interfaces for accessing cloud computing cost management exports, according to some aspects.
Figure 7C:
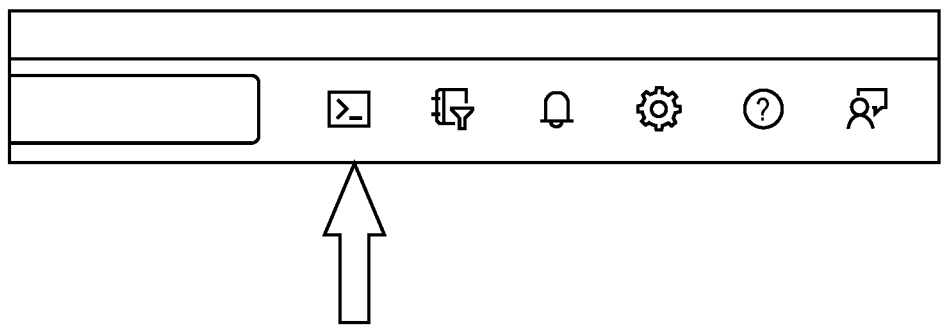
FIG. 7C depicts graphical user interfaces for accessing cloud shells, according to some aspects.
Figure 7D:
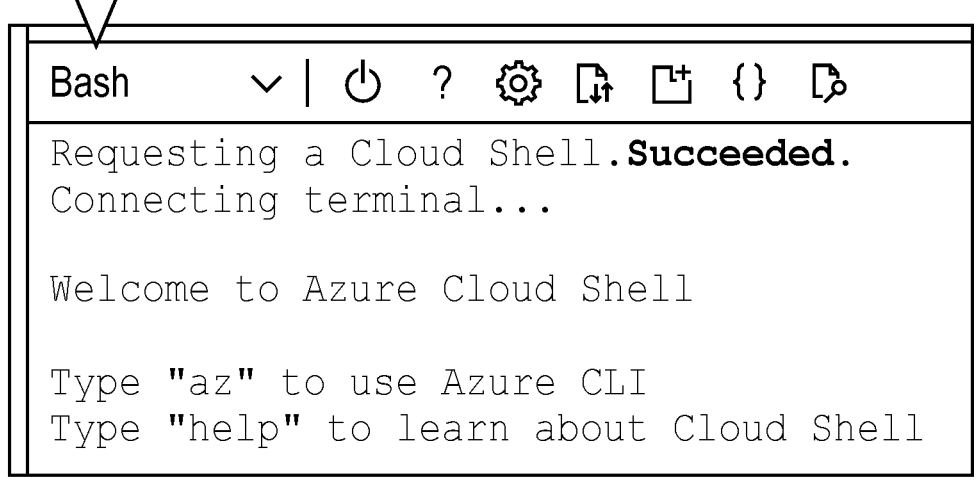
FIG. 7D depicts graphical user interfaces for accessing a cloud shell terminal, according to some aspects.
Figure 7E:
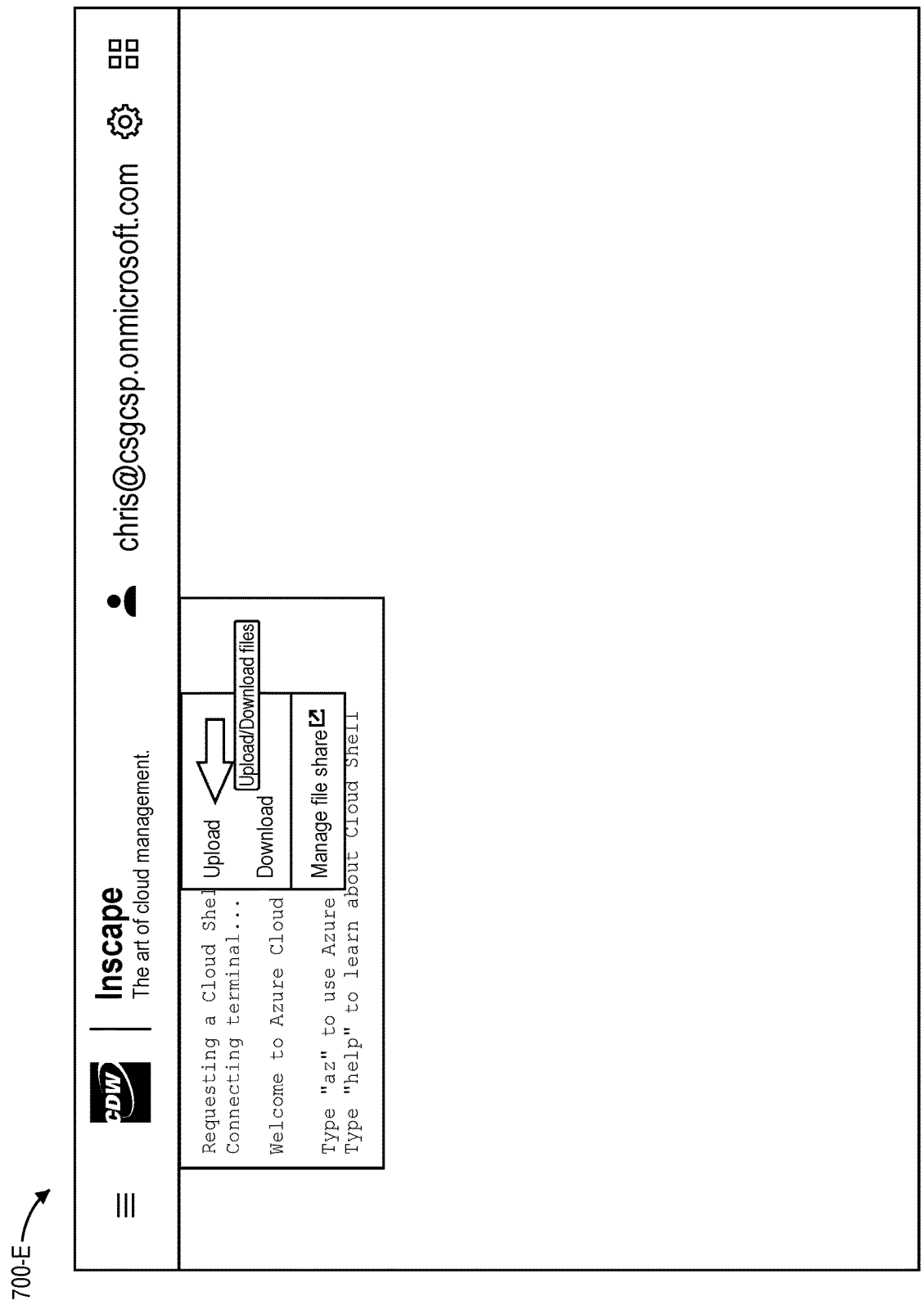
FIG. 7E depicts graphical user interfaces for uploading/downloading files (e.g., scripts) to the cloud shell terminal, according to some aspects.

For example, FIG. 6A depicts graphical user interfaces for accessing cloud computing access control resources, according to some aspects. FIG. 6B depicts graphical user interfaces for accessing cloud computing access control resources, according to some aspects. FIG. 6C depicts graphical user interfaces for accessing cloud computing access control resources, according to some aspects. FIG. 7A depicts graphical user interfaces for accessing cloud computing subscription resources, according to some aspects. FIG. 7B depicts graphical user interfaces for accessing cloud computing cost management exports, according to some aspects. FIG. 7C depicts graphical user interfaces for accessing cloud shells, according to some aspects. FIG. 7D depicts graphical user interfaces for accessing a cloud shell terminal, according to some aspects. FIG. 7E depicts graphical user interfaces for uploading/downloading files (e.g., scripts) to the cloud shell terminal, according to some aspects. FIG. 7F depicts graphical user interfaces for accessing and deploying Identity Access Management (IAM) resources, according to some aspects. FIG. 7G depicts graphical user interfaces for confirming access to IAM resources, according to some aspects.

In some aspects, some or all of the data entry steps via the user interfaces of FIGS. 6A-7G may be automated via scripting.

Exemplary Computer-Implemented Methods

Figure 8:
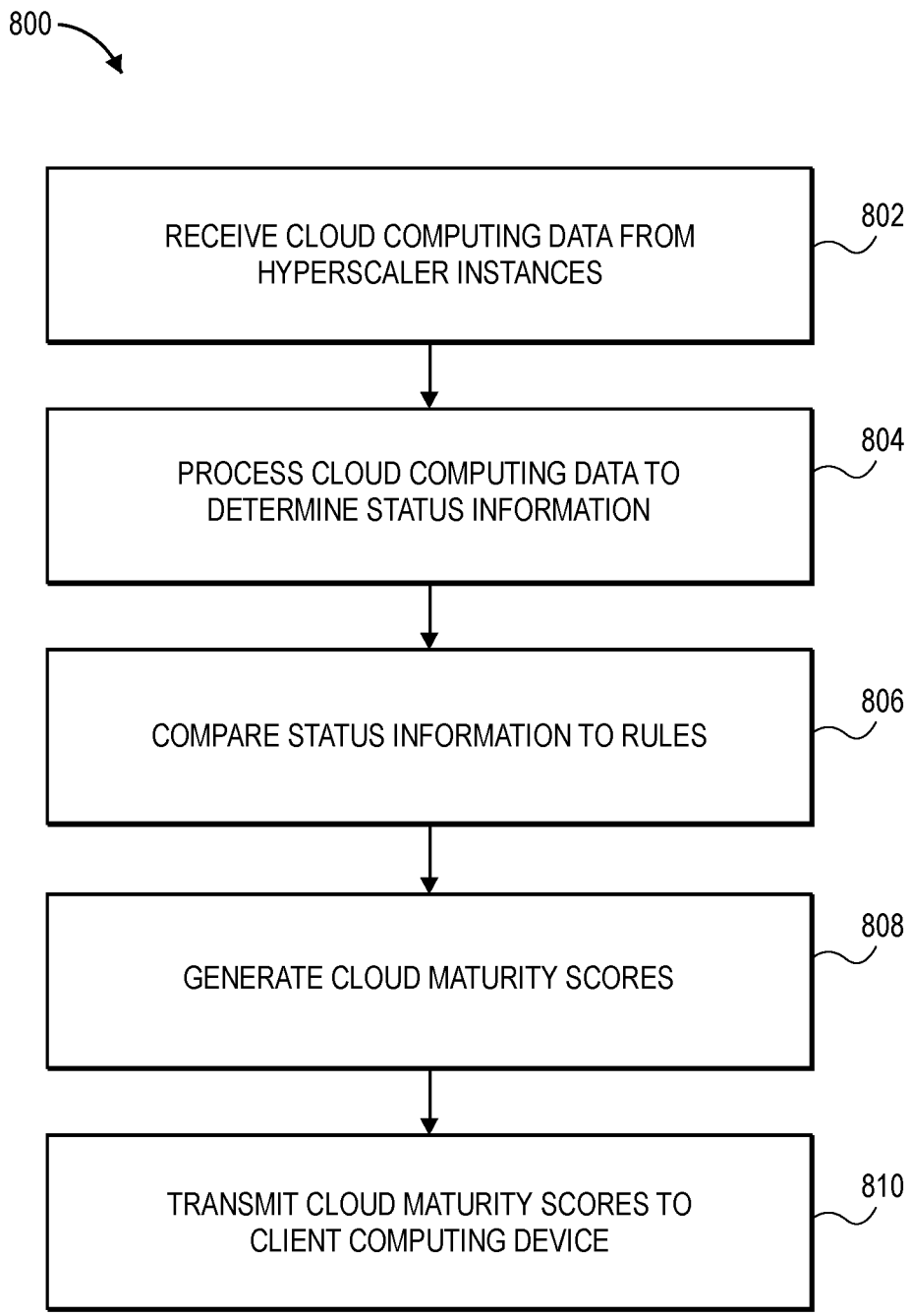
FIG. 8 depicts an exemplary computer-implemented method for providing cloud maturity scores for improving cloud computing health, according to some aspects.

FIG. 8 depicts an example computer-implemented method 600 for providing cloud maturity scores to improve cloud computing health, according to some aspects. For example, the method 800 may be implemented using the cloud environment 100 of FIG. 1A and/or the environment 160 of FIG. 1B.

The method 800 may include receiving, via one or more processors, cloud computing data from one or more hyperscaler instances (block 802). The hyperscaler instances may include one or more of one of (i) a Microsoft Azure instance, (ii) an Amazon Web Services instance, or (iii) a Google Cloud Platform instance. As discussed, the cloud computing data may include statistical data and metrics from the one or more cloud computing platforms. In some aspects, the method 800 may include normalizing the data received from multiple cloud providers, so that the data can be directly compared and communicated to users (e.g., cloud administrators/technicians).

This represents a significant improvement over conventional use of cloud systems, wherein the user must access multiple portals that do not display information in a concise and centralized manner. For example, the received cloud computing data may include respective utilization information corresponding to a plurality of MariaDB instances across a plurality of cloud providers. The instructions may include normalizing the MariaDB utilization information so that each respective utilization value is comparable (e.g., expressed in the same unit, such as a percentage or an array/dictionary of values related to multiple axes of utilization such as disk usage, memory usage, replication status, CPU usage, etc.).

The method 800 may include processing, via one or more processors, the cloud computing data from the one or more hyperscaler instances to determine respective status information corresponding to the one or more hyperscalers (block 804). Specifically, the method 800 may include evaluating propositions or statements (e.g., computer code) stored in a data structure, such as the actions 524 in the cloud computing rules 510 data structure.

The method 800 may include comparing, via one or more processors, the respective status information to one or more rules in a rules data structure (block 806). To continue the above example, the method 800 may process the MariaDB utilization information to determine whether the MariaDB instance(s) are underutilized. When the processing at this step indicates that any of the MariaDB instance(s) are underutilized, the ruleset 520-B of FIG. 5O may be triggered (i.e., evaluated to True), causing the value 526 representing a corresponding weight for rectifying the problem (i.e., right-sizing the underutilized instance) to be available for incrementing the user's cloud maturity score.

In some aspects, the method 800 may include instructions for storing the status information generated by the comparing (e.g., in the database 108 of FIG. 1A). The method 800 may include instructions that require multiple evaluations to occur before the user's cloud maturity score will be affected. For example, the method 800 may generate a moving average of the status information over an hour, a day, a week or a longer period of time. In this example, the method 800 may only decrement the user's cloud maturity score for the underutilized MariaDB instance once the underutilization evaluation for that instance is True for more than a predetermined period of time (e.g., three hours). This advantageously prevents the user's cloud maturity score from being affected by temporary utilization spikes. In still further aspects, the method 800 may include processing the stored status information to identify the presence of utilization values (e.g., maximum values) that indicate usage patterns requiring increased load balancing or other cloud management practices.

The method 800 may include generating, based on the comparing, one or more cloud maturity scores each corresponding to one of the one or more rules (block 808). Continuing the example, the method 800 may receive/retrieve a score of the user (e.g., via the electronic database 108 of FIG. 1A). The method 800 may increment or decrement the cloud maturity score of the use based on the evaluation of the one or more rules. For example, continuing the above example, the method 800 may decrement the user's cloud maturity by the value 526, until such time that the cloud computing data received from the one or more hyperscaler instances indicates that the underutilization of the MariaDB has been rectified.

As noted, multiple scores may be accorded to a single user. For example, the user may receive a separate cloud maturity score for each cloud instance of the user's cloud environment. In some aspects, the method 800 may accord cloud maturity scores to the user on a server or instance level. For example, the method 800 may generate respective cloud maturity scores for a web server, a database server, and a load balancing server. In some aspects, the method 800 may generate respective cloud maturity scores on a service-by-service level. For example, the method 800 may score the user's Apache web server, the user's NGINX web server, and the user's Microsoft web server separately. In still further examples, the method 800 may aggregate one or more scores, to enable the user to gauge performance of servers, services, or other categorical or functional groupings of software, hardware and/or services.

The method 800 may include transmitting, via an electronic network, the one or more cloud maturity scores to a client computing device (block 810). The method 800 may include generating a table of one or more recommendations based on the one or more cloud maturity scores; and causing the table to be displayed in a graphical user interface of a client computing device, For example, the score(s) may be communicated to the user via a graphical user interface such as the cloud environment maturity graphical user interface 400 depicted in FIG. 4A and FIG. 4B. As discussed, the method 800 may include displaying the cloud maturity score(s) in numerical, textual and/or pictorial/graphical form. The displayed cloud maturity scores may be shown in detail as recommendations for improvement.

Specifically, the method 800 may show some or all of the actions 524 as opportunities for improvement, when the processing of data from the one or more hyperscaler instances indicates that the status of the action is False. The recommendations include recommendations that correspond to a plurality of different cloud computing providers. This represents a solution to a problem identified in conventional cloud management practices, which is that users are required to access multiple different cloud management interfaces, all of which have different management interfaces, to attempt to correct issues in an ad hoc and disorganized fashion. By presenting a unified interface, which shows recommendations pertaining to multiple different cloud platforms (e.g., as many as 20 or more), the user no longer has to juggle multiple unwieldy interfaces, each of which as a different management interface.

The method 800 may include receiving a user selection corresponding to the table; and causing, based on the user selection, one or more actions to be performed with respect to the one or more hyperscaler instances. Specifically, the method 800 may include executing instructions that cause API calls and/or scripts to be executed using stored credentials of the user, as depicted in FIGS. 6A-7G. For example, continuing the above example, the method 800 may cause the underutilized MariaDB to be reduced in size, to right-size the utilization of that resource. This may include reducing the processing resources and/or memory resources of the instance. In some aspects, this may include performing a downgrade by switching the user's instance to a different predetermined service tier within the third party cloud platform.

In some aspects, the method 800 may determining and/or updating one or more weights of the rules data structure. For example, the machine learning training module 134 of FIG. 1A may process historical data using a trained machine learning model. The historical data may include cloud computing data collected from one or more hyperscaler instances via the hyperscaler module 130. The historical data may be stored in the database 108, for example. The historical data may include status information generated by processing the cloud computing data (e.g., statistics and metrics). In some aspects, the historical data may include data normalized as discussed herein. In some aspects, the machine learning training module 134 may process the data to identify anomalies. For example, the machine learning training module 134 may apply an unsupervised learning algorithm that clusters events corresponding to downtime, server crashes, spikes in CPU utilization, data storage issues, etc. For example, the unsupervised machine learning algorithm may determine that a certain log file is several gigabytes in size. The machine learning training module 134 may train a model to output recommendations regarding the toggling of configuration parameters to avoid the creation of such large log files. In some aspects, the machine learning training module 134 may train a supervised machine learning model using labeled training data. The labeled training data may include a set of log messages related to security vulnerabilities or outdated software. The machine learning training module 134 may train the supervised model to identify de novo messages related to such issues within the user's cloud environment, and to generate recommendations (actions) and cloud maturity weights for fixing such issues.

The method 800 may include processing determining an industry that the one or more hyperscalers are operating within by analyzing the cloud computing data from the one or more hyperscaler instances; and adjusting one or more of the weights of the rules data structure based upon the industry. For example, a multiplier may be added to any weight of any action corresponding to personally-identifiable information in the healthcare sector. For other industries (e.g., financial customers) other weights may be emphasized (e.g., instance performance/network latency/fault tolerance). For still other customers/users, cost reduction may be a paramount concern, and may be used to set weights. For example, a machine learning model may be trained that seeks to identify and eliminate any excess capacity. The method 800 may infer the industry of the user based on the activities of the user's cloud instances. In some aspects, the method 800 may include receiving answers to a questionnaire in which the user self-identifies the user's industry. As discussed above, in some aspects, the behavior of the customer/user may be analyzed to determine how to adjust weights. For example, a company may consistently delegate 50% utilization across cloud providers. The present techniques may infer this behavior (e.g., using a trained behavior analysis machine learning model) and increase the customer's cloud maturity score when that inferred metric is reached.

The method 800 may include ranking the user against other like industry customers/peers. The ranking may indicate the user's overall ranking against other users and their respective cloud instances (which may number in the hundreds or thousands). The method 800 may provide recommendations based on a customer/user profile, which are tailored for the specific customer. The method 800 may provide a ranking among a given industry. For example, the cloud maturity score of FIG. 4A may be shown as among a given cohort of users (e.g., among health care providers), depicting the user's performance within that cohort (e.g., "your cloud maturity score ranks fourth among health care providers.")

Exemplary Computer-Generated Digital Reports

As discussed herein, the present techniques may include computer-executable instructions for generating one or more digital reports. For example, the cloud maturity system 104 of FIG. 1A may include a report generating module (not depicted) that generates one or more reports based on information collected from the cloud environment ENV1. For example, the hyperscaler collection module 130 may collect information corresponding to one or more of the cloud instances of a particular user or customer, and the report generation module may retrieve that information, which may have been processed further, from the database 108. The report generation module may construct one or more reports by interpolating the information retrieved from the database 108 into one or more pre-determined report templates, which may be stored in the memory 112 of the cloud maturity system 104, for example.

Figure 9E:
FIG. 9E depicts an exemplary graphical user interface for displaying a multicloud management anomaly report, according to some aspects.

For example, FIG. 9A depicts an exemplary graphical user interface for displaying a multicloud management spending statistics and recommendations report 900, according to some aspects. FIG. 9B depicts an exemplary graphical user interface for displaying a multicloud management potential spending savings/recommendations by category report 910, according to some aspects. FIG. 9C depicts an exemplary graphical user interface for displaying a multicloud management spending statistics/virtual machine (VM) rightsizing recommendation report 920, according to some aspects. FIG. 9D depicts an exemplary graphical user interface for displaying a multicloud management maturity score report 930, according to some aspects. FIG. 9E depicts an exemplary graphical user interface for displaying a multicloud management anomaly report 940, according to some aspects. It should be appreciated that the reports in FIGS. 9A-9E are for expository purposes only, and that additional reports, with production quality interpolated, are envisaged.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, which is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the aspects herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computing system for providing cloud maturity scores for improving cloud computing health, comprising:
   one or more processors;
   an electronic network; and
   one or more memories having stored thereon computer-executable instructions that, when executed by the one or more processors, cause the computing system to:
   receive cloud computing data from one or more hyperscaler instances;
   process the cloud computing data from the one or more hyperscaler instances to determine respective status information corresponding to the one or more hyperscalers;
   compare the respective status information to one or more rules in a rules data structure;
   update one or more weights of the rules data structure by processing historical data using a trained machine learning model;
   generate one or more cloud maturity scores each corresponding to one of the one or more rules; and
   transmit, via the electronic network, the one or more cloud maturity scores to a client computing device.

2. The computing system of claim 1, wherein the one or more hyperscaler instances include one or more of one of (i) a Microsoft Azure instance, (ii) an Amazon Web Services instance, or (iii) a Google Cloud Platform instance.

3. The computing system of claim 1, the one or more memories having stored thereon computer-executable instructions that, when executed by the one or more processors, cause the computing system to:
   generate a table of one or more recommendations based on the one or more cloud maturity scores; and
   cause the table to be displayed in a graphical user interface of a client computing device, wherein the table includes one or more recommendations based on the one or more cloud maturity scores and the respective status information.

4. The computing system of claim 3, wherein the recommendations include recommendations that correspond to a plurality of different cloud computing providers.

5. The computing system of claim 3, the one or more memories having stored thereon computer-executable instructions that, when executed by the one or more processors, cause the computing system to:
   receive a user selection corresponding to the table; and
   cause, based on the user selection, one or more actions to be performed with respect to the one or more hyperscaler instances.

6. The computing system of claim 1, the one or more memories having stored thereon computer-executable instructions that, when executed by the one or more processors, cause the computing system to:
   (i) determine an industry that the one or more hyperscalers are operating within by analyzing the cloud computing data from the one or more hyperscaler instances; and
   (ii) adjust one or more of the weights of the rules data structure based upon the industry.

7. A computer-implemented method of providing cloud maturity scores for improving cloud computing health, comprising:
   receiving, via one or more processors, cloud computing data from one or more hyperscaler instances;
   processing, via one or more processors, the cloud computing data from the one or more hyperscaler instances to determine respective status information corresponding to the one or more hyperscalers;
   comparing, via one or more processors, the respective status information to one or more rules in a rules data structure;
   updating, via one or more processors, one or more weights of the rules data structure by processing historical data using a trained machine learning model
   generating, based on the comparing, one or more cloud maturity scores each corresponding to one of the one or more rules; and
   transmitting, via an electronic network, the one or more cloud maturity scores to a client computing device.

8. The computer-implemented method of claim 7, wherein the one or more hyperscaler instances include one or more of one of (i) a Microsoft Azure instance, (ii) an Amazon Web Services instance, or (iii) a Google Cloud Platform instance.

9. The computer-implemented method of claim 7, further comprising:
   generating a table of one or more recommendations based on the one or more cloud maturity scores; and
   causing the table to be displayed in a graphical user interface of a client computing device,
   wherein the table includes one or more recommendations based on the one or more cloud maturity scores and the respective status information.

10. The computer-implemented method of claim 9, wherein the recommendations include recommendations that correspond to a plurality of different cloud computing providers.

11. The computer-implemented method of claim 9, wherein the recommendations include recommendations that correspond to a plurality of different cloud computing providers.

12. The computer-implemented method of claim 9, further comprising:
   receiving a user selection corresponding to the table; and
   causing, based on the user selection, one or more actions to be performed with respect to the one or more hyperscaler instances.

13. The computer-implemented method of claim 7, wherein updating the one or more rules of the rules data structure by processing the historical data using the trained machine learning model includes (i) determining an industry that the one or more hyperscalers are operating within by analyzing the cloud computing data from the one or more hyperscaler instances; and (ii) adjusting one or more of the weights of the rules data structure based upon the industry.

14. A computer-readable medium having stored thereon computer-executable instructions that, when executed, cause a computer to:
receive cloud computing data from one or more hyperscaler instances;
process the cloud computing data from the one or more hyperscaler instances to determine respective status information corresponding to the one or more hyperscalers;
compare the respective status information to one or more rules in a rules data structure;
update one or more weights of the rules data structure by processing historical data using a trained machine learning model;
generate one or more cloud maturity scores each corresponding to one of the one or more rules; and
transmit, via an electronic network, the one or more cloud maturity scores to a client computing device.

15. The computer-readable medium of claim 14 having stored thereon computer-executable instructions that, when executed, cause a computer to:
generate a table of one or more recommendations based on the one or more cloud maturity scores; and
cause the table to be displayed in a graphical user interface of a client computing device, wherein the table includes one or more recommendations based on the one or more cloud maturity scores and the respective status information.

16. The computer-readable medium of claim 15 having stored thereon computer-executable instructions that, when executed, cause a computer to:
receive a user selection corresponding to the table; and
cause, based on the user selection, one or more actions to be performed with respect to the one or more hyperscaler instances.

17. The computer-readable medium of claim 14 having stored thereon computer-executable instructions that, when executed, cause a computer to:
(i) determine an industry that the one or more hyperscalers are operating within by analyzing the cloud computing data from the one or more hyperscaler instances; and
(ii) adjust one or more of the weights of the rules data structure based upon the industry.

* * * * *